United States Patent
Zhang

(10) Patent No.: US 10,823,037 B2
(45) Date of Patent: Nov. 3, 2020

(54) METHODS AND SYSTEMS FOR AN ENGINE

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/216,015

(22) Filed: Dec. 11, 2018

(65) Prior Publication Data
US 2019/0107030 A1   Apr. 11, 2019

Related U.S. Application Data

(62) Division of application No. 15/179,837, filed on Jun. 10, 2016, now Pat. No. 10,190,474.

(51) Int. Cl.
| | |
|---|---|
| *F01N 13/08* | (2010.01) |
| *F01N 3/08* | (2006.01) |
| *F02M 26/14* | (2016.01) |
| *F02B 37/00* | (2006.01) |
| *F02D 41/00* | (2006.01) |
| *F02M 26/22* | (2016.01) |

(52) U.S. Cl.
CPC ............. *F01N 13/08* (2013.01); *F01N 3/08* (2013.01); *F02B 37/00* (2013.01); *F02D 41/0077* (2013.01); *F02M 26/14* (2016.02); *F02M 26/22* (2016.02); *F01N 2290/00* (2013.01); *F01N 2390/02* (2013.01); *F01N 2410/00* (2013.01); *F01N 2560/06* (2013.01); *F01N 2560/08* (2013.01); *F02D 41/0065* (2013.01); *Y02T 10/144* (2013.01); *Y02T 10/47* (2013.01)

(58) Field of Classification Search
CPC ........ F01N 13/08; F01N 3/08; F01N 2290/00; F01N 2390/02; F01N 2560/06; F01N 2560/08; F01N 2410/00; F02M 26/14; F02M 26/22; F02B 37/00; F02D 41/0065; F02D 41/0077; Y02T 10/144; Y02T 10/47
USPC .......................................... 60/280, 287, 288
See application file for complete search history.

(56) References Cited

U.S. PATENT DOCUMENTS

| | | | |
|---|---|---|---|
| 3,955,364 A | 5/1976 | Lewis | |
| 4,163,543 A * | 8/1979 | Cook | ........................ F01N 3/22 251/48 |
| 6,301,888 B1 | 10/2001 | Gray, Jr. | |
| 6,651,432 B1 | 11/2003 | Gray, Jr. | |
| 9,885,296 B2 * | 2/2018 | Zhang | ........................ F02D 9/14 |
| 10,060,365 B2 | 8/2018 | Zhang | |
| 2013/0180240 A1 | 7/2013 | Horne et al. | |
| 2014/0202149 A1 | 7/2014 | Park | |

* cited by examiner

*Primary Examiner* — Thai Ba Trieu
*Assistant Examiner* — Dapinder Singh
(74) *Attorney, Agent, or Firm* — Geoffrey Brumbaugh; McCoy Russell LLP

(57) ABSTRACT

Methods and systems are provided for an exhaust bypass valve and a heat exchanger upstream of a three-way valve. In one example, a method may include flowing exhaust gas through one or more of an exhaust passage, bypass passage, recirculating passage, and EGR passage based on positions of a three-way valve and a bypass valve.

9 Claims, 13 Drawing Sheets

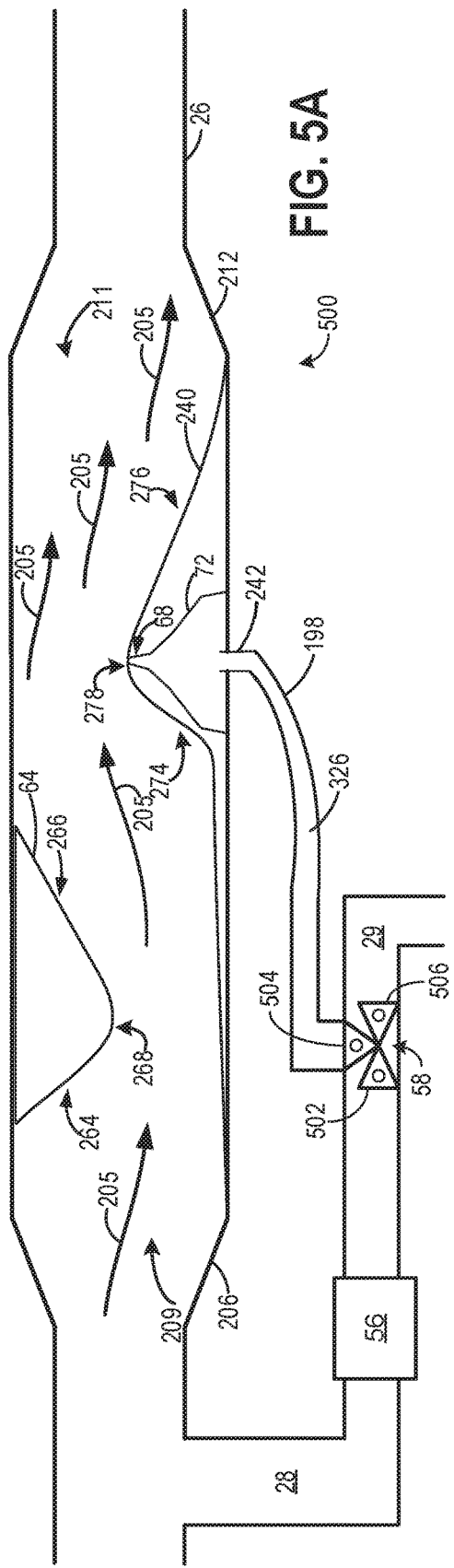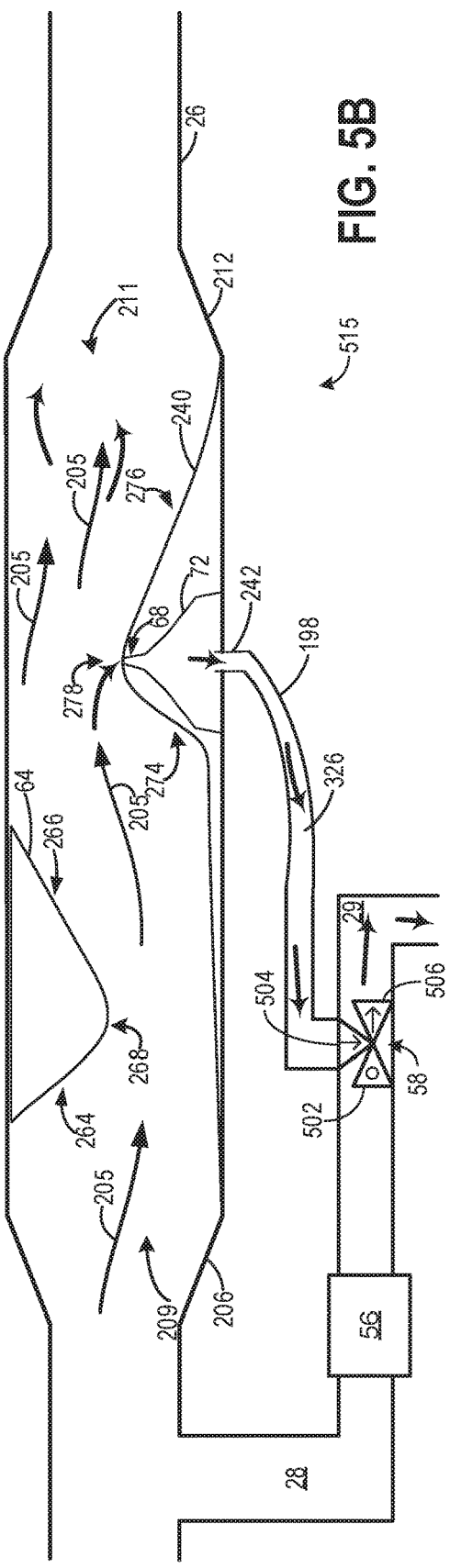

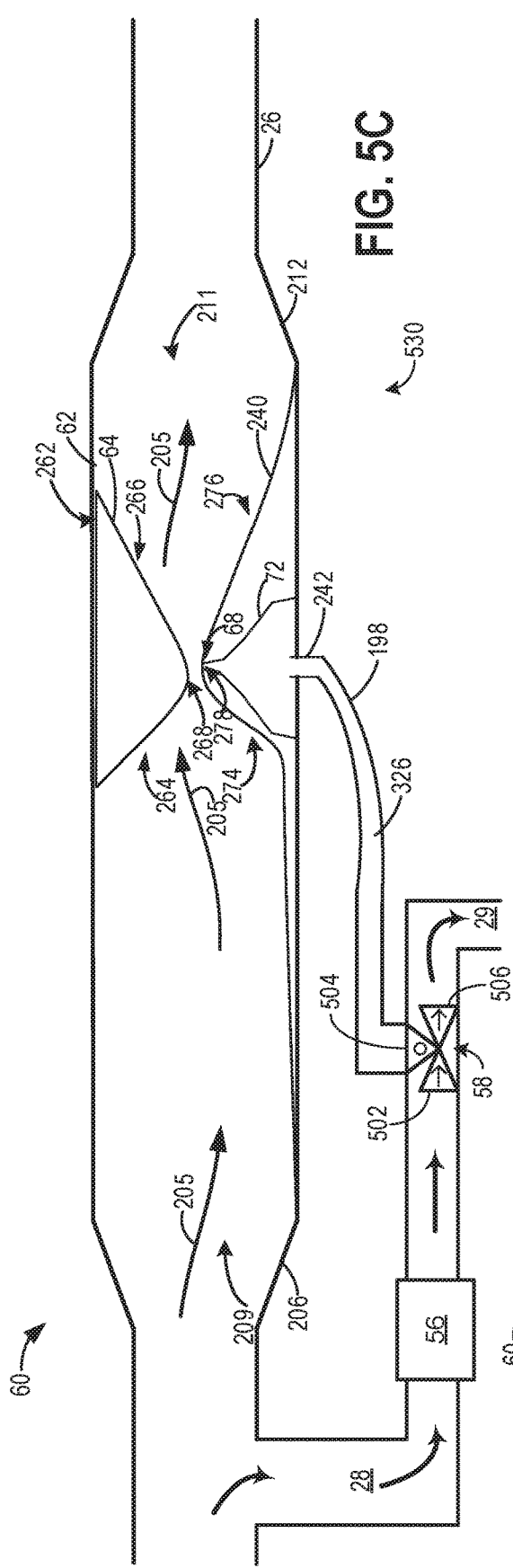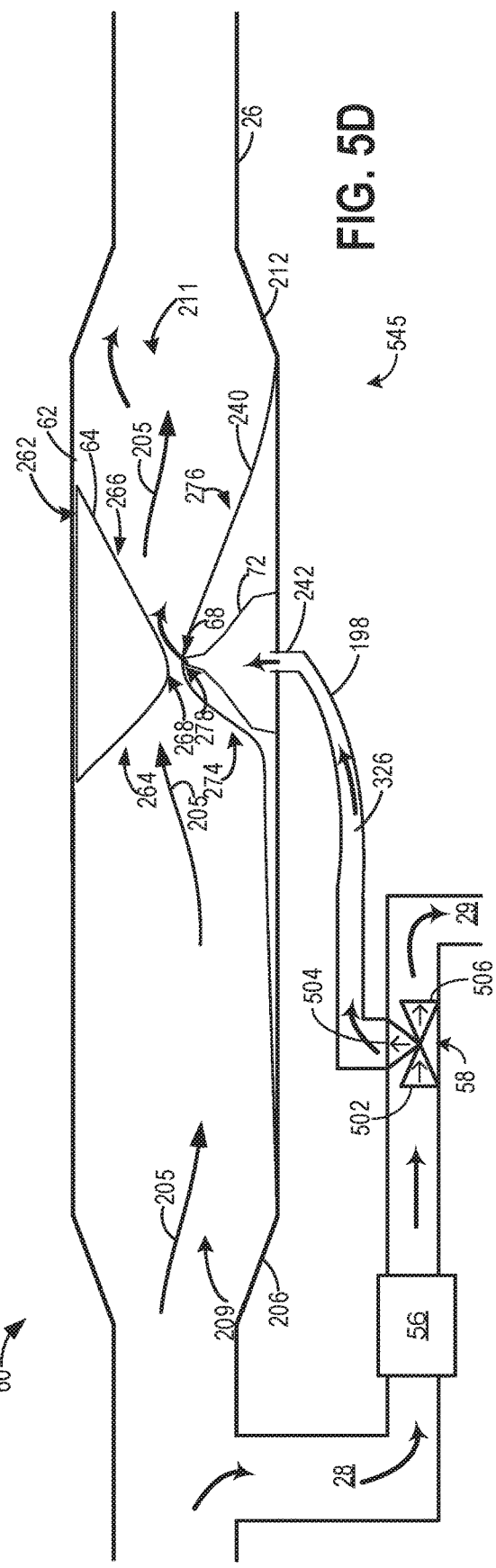

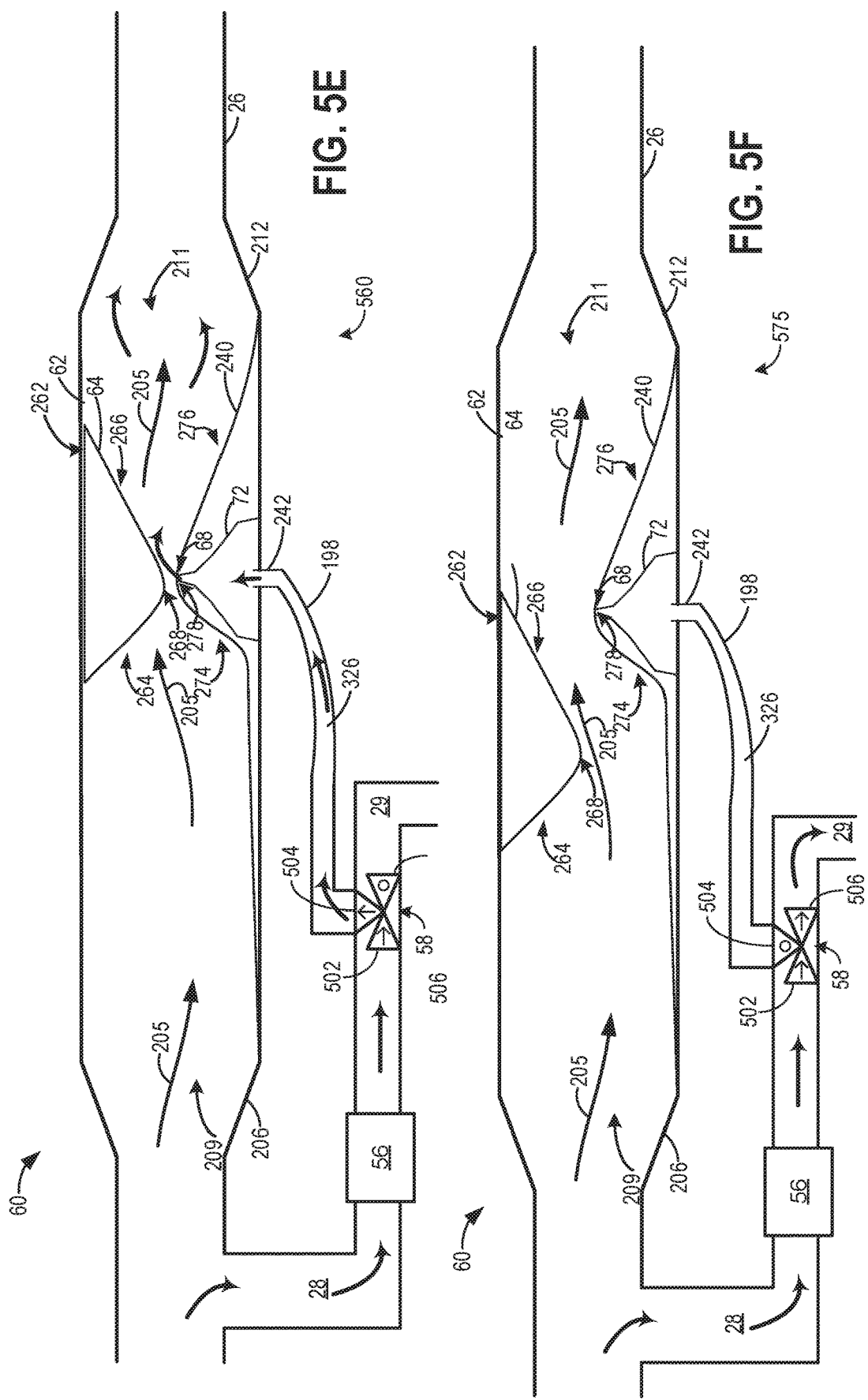

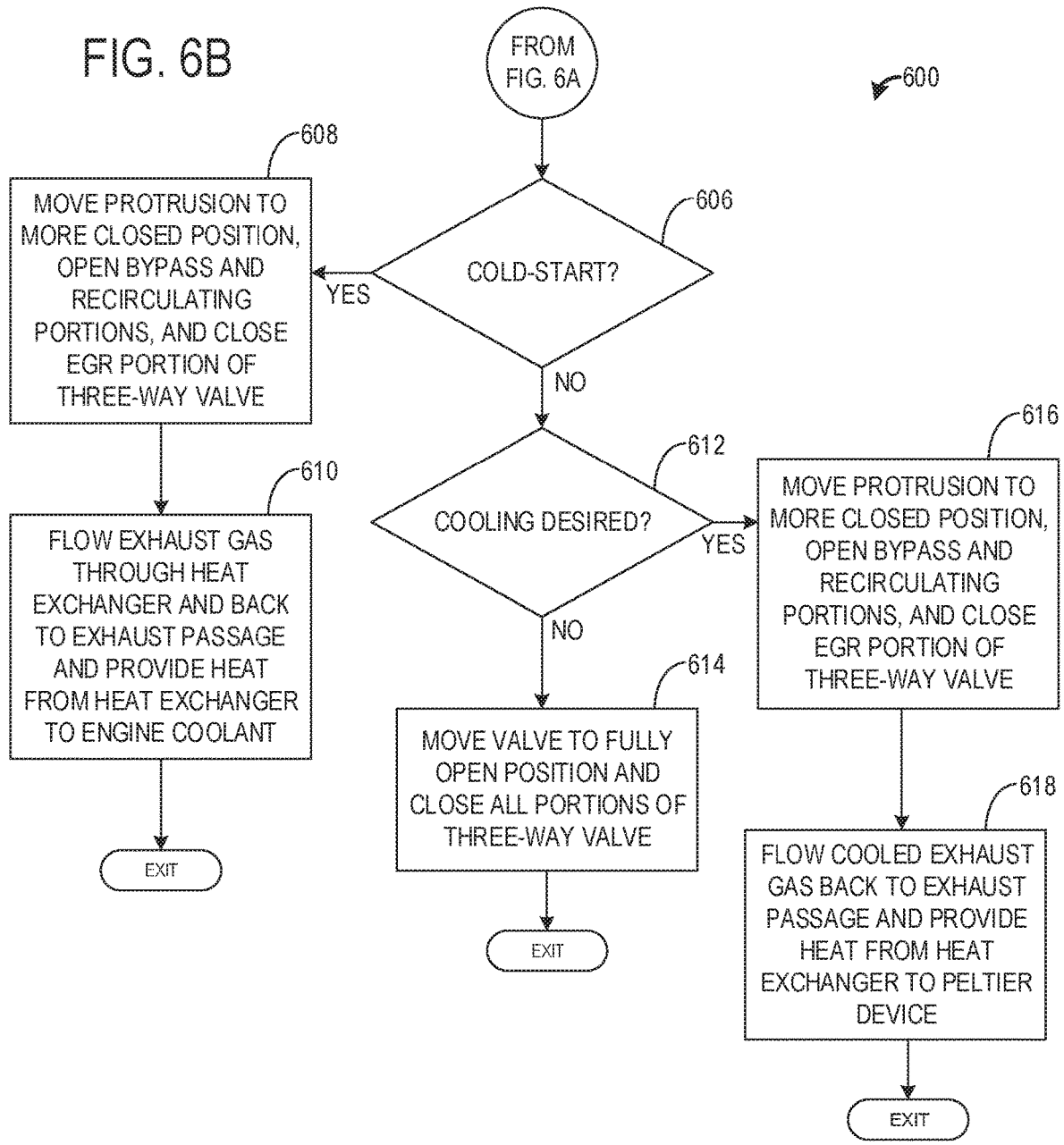

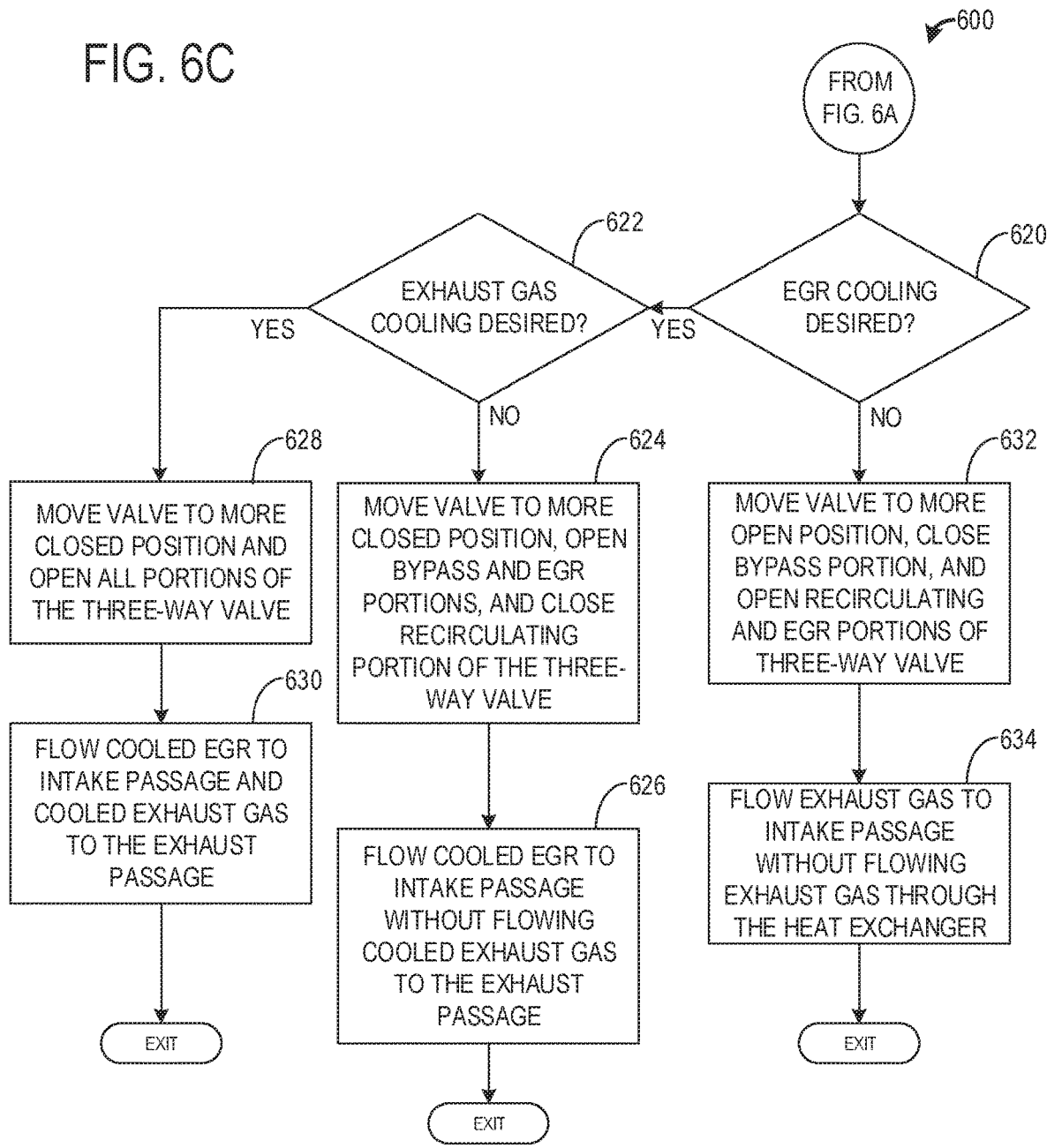

METHODS AND SYSTEMS FOR AN ENGINE

CROSS REFERENCE TO RELATED APPLICATION

The present application is a divisional of U.S. patent application Ser. No. 15/179,837, entitled "METHODS AND SYSTEMS FOR AN ENGINE," filed on Jun. 10, 2016. The entire contents of the above-referenced application are hereby incorporated by reference in its entirety for all purposes.

FIELD

The present description relates generally to methods and systems for an exhaust system comprising a heat exchanger.

BACKGROUND/SUMMARY

Atmospheric nitrogen may react with intake oxygen to form nitrogen oxides ($NO_x$) during combustion in internal combustion engines. As such, vehicles often include aftertreatment devices, such as, selective catalytic reduction (SCR) devices, $NO_x$ traps, and other reduction catalysts for reducing $NO_x$ to other species (e.g., $N_2$ and $H_2O$). Another method for reducing $NO_x$ emissions includes recirculating engine exhaust gas back to an engine intake via an exhaust gas recirculation (EGR) pathway.

However, most $NO_x$ is formed during engine cold-start, where engine temperatures are below a desired operating temperature and a catalyst has not reached a light-off temperature. EGR may not be used during cold-start such that the engine may reach the desired operating temperature more quickly.

Other attempts to address $NO_x$ emissions include using a heat exchanger, where the heat exchanger assists heating the engine during cold-start by siphoning heat from hot exhaust gas and transferring the heat to engine coolant. By doing this, the engine heats up more quickly, thereby lighting-off the catalyst more quickly, which may reduce $NO_x$ emissions. One example approach is shown by Park in U.S. 2014/0202149. Therein, a waste heat recovery device receives heat from the exhaust gas, where the heat may be used to heat a working fluid (e.g., engine coolant, turbine coolant, etc.).

However, the inventors herein have recognized potential issues with such systems. As one example, EGR gas flows from an exhaust passage, into an EGR passage, through a super heater and boiler, and into an intake passage. Heat from the exhaust gas is sequestered by the super heater and boiler and delivered to a working fluid of a waste heat recovery system. As such, the system disclosed by Park may only provide cooled exhaust gas. Furthermore, the cooled exhaust gas may not flow back to exhaust passage to adjust a temperature of exhaust gas.

In one example, the issues described above may be addressed by a method comprising flowing exhaust gas through an exhaust passage while not flowing exhaust gas through a bypass passage, a recirculating passage, and an EGR passage with a three-way valve in a fully closed position and a bypass valve in a more open position, flowing exhaust gas through the exhaust passage and through the recirculating passage into the EGR passage, while not flowing exhaust gas through the bypass passage with a bypass portion of the three-way valve being closed and the three-way valve in the more open position, and flowing exhaust gas through the exhaust passage and through a heat exchanger of the bypass passage into the EGR passage, while not flowing exhaust gas through the recirculating passage with a recirculating portion of the three-way valve being closed and the bypass valve in a more closed position.

In this way, hot and cold EGR may be provided to an engine, while also provided cooled exhaust gas to a hot exhaust gas flow.

As one example, a venturi effect may be generated between the slidable protrusion and the protrusion such that a vacuum is created at apexes of the protrusion and the flange. The vacuum may naturally promote exhaust gas that has been bypass to return to the exhaust passage. In some examples, the exhaust gas returning to the exhaust passage is cooler than exhaust gas in the exhaust passage due to the bypassed exhaust gas flowing through a heat exchanger prior to returning to the exhaust passage. In this way, a temperature of exhaust aftertreatment devices may be more accurately maintained across a larger range of operating conditions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 5A, 5B, 5C, 5D, 5E, and 5F show example exhaust flows based on positions of both the slidable protrusion and valve portions of a three-way valve.

FIGS. 2-5F are shown approximately to scale, however, other relative dimensions may be used without departing from the scope of the present disclosure.

FIGS. 6A, 6B, and 6C show methods for adjusting a position of one or more of the slidable protrusion and valve portions of the three-way valve based on engine operating parameters.

DETAILED DESCRIPTION

Figure 2A:
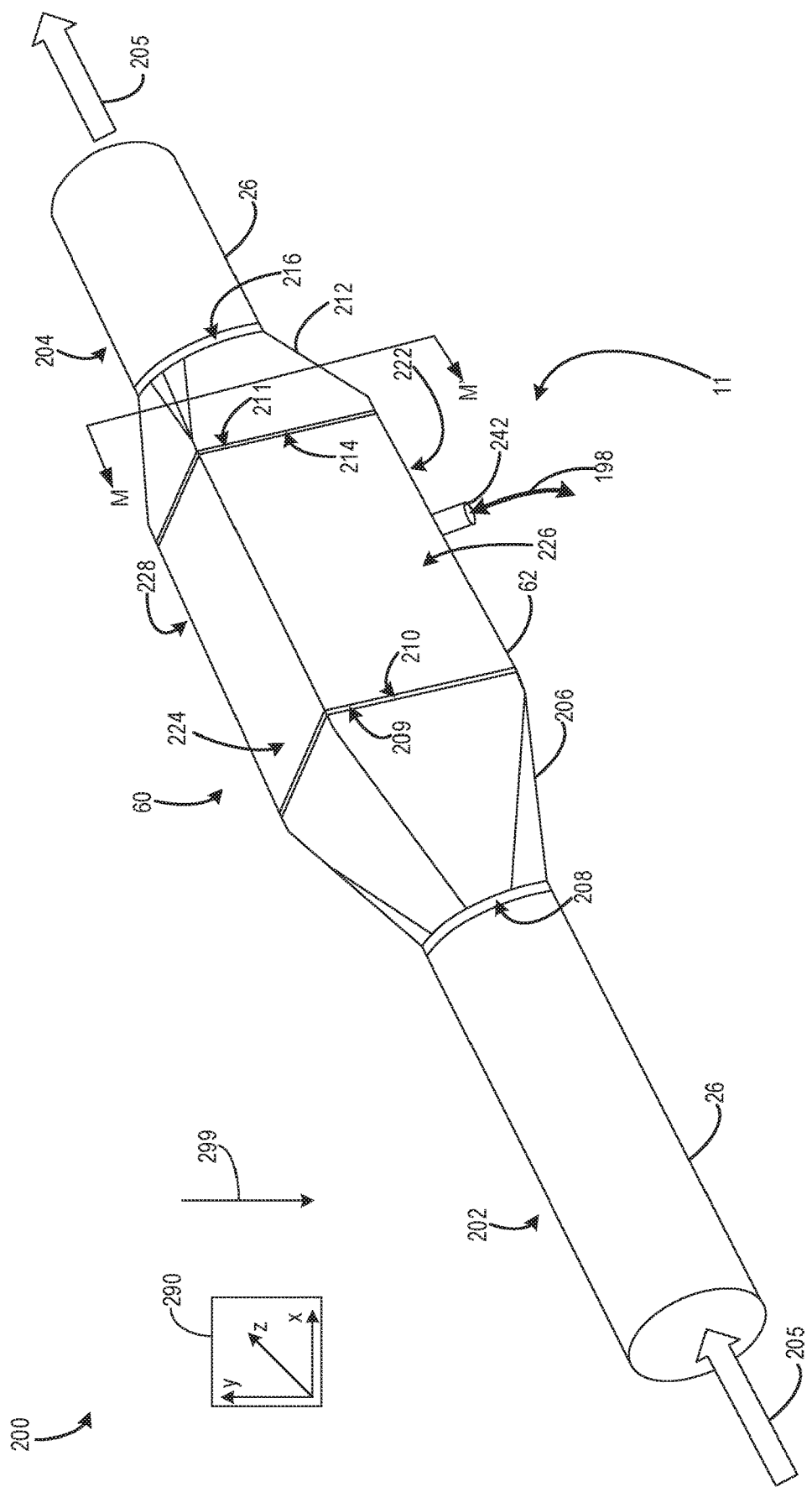
FIGS. 2A and 2B show exterior and interior views of a bypass valve, respectively.
Figure 2B:
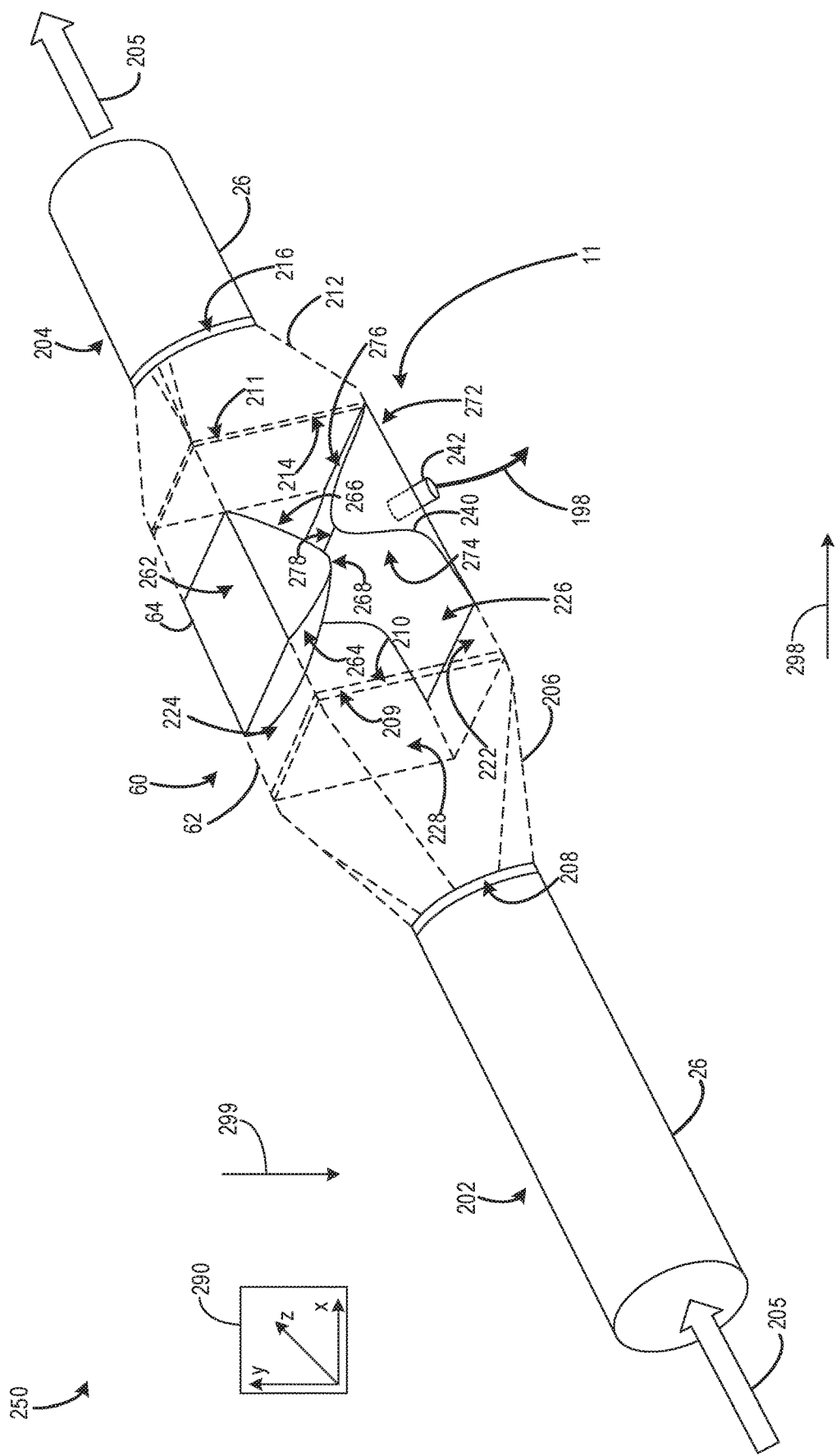
Figure 3:
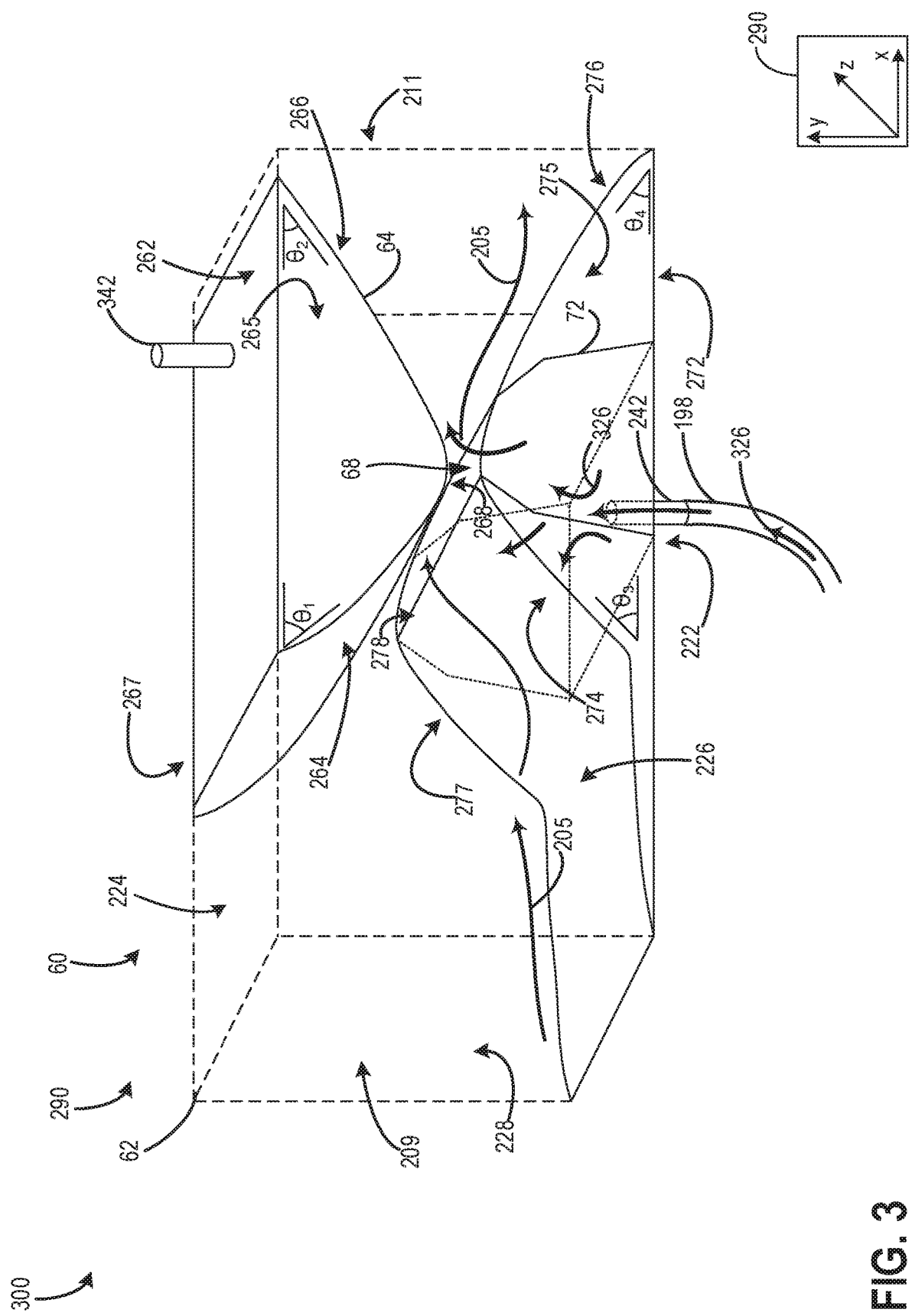
FIG. 3 shows interior view of components in the bypass valve.
Figure 4A:
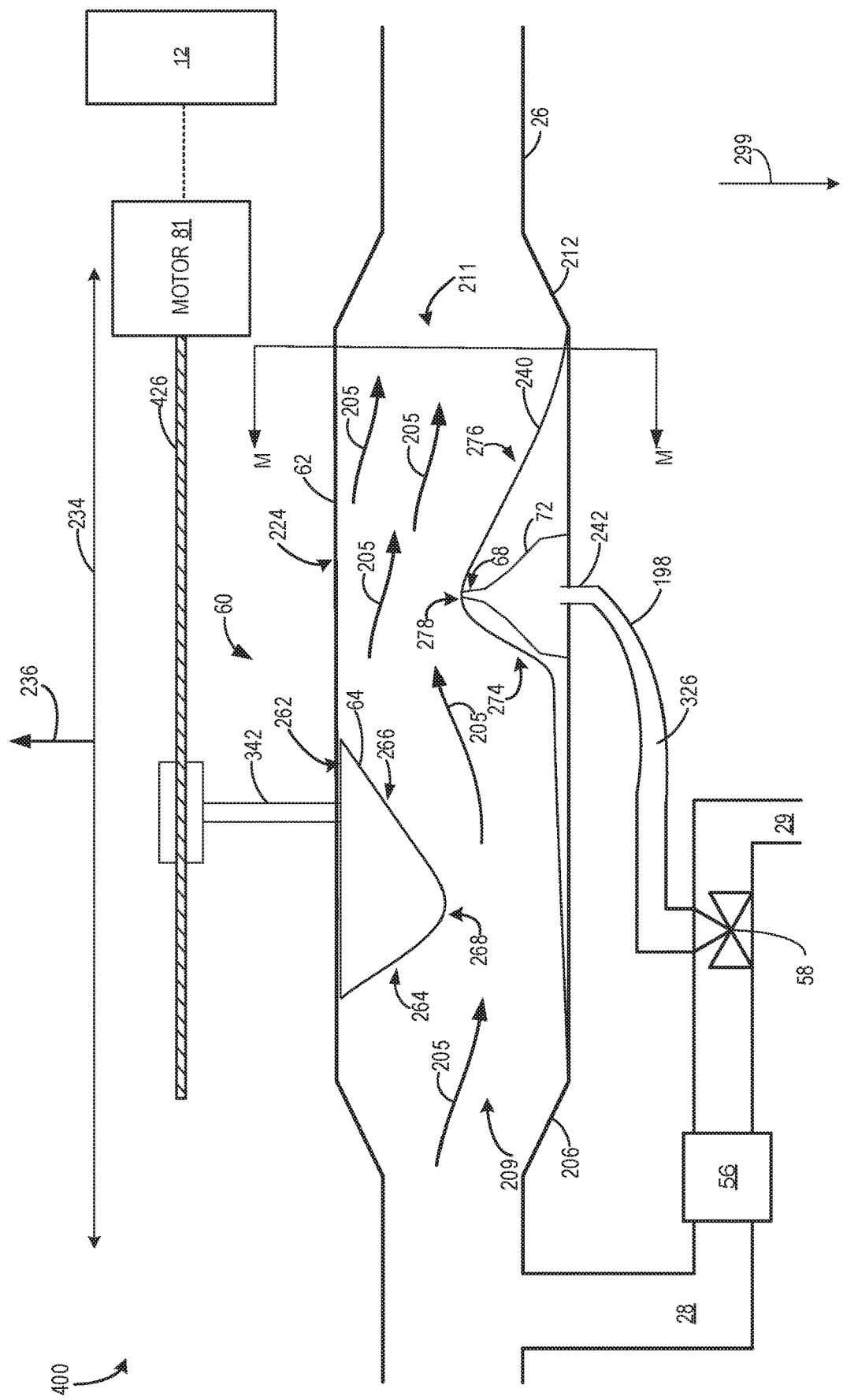
FIGS. 4A, 4B, and 4C show different positions of a slidable protrusion relative to a flange in the bypass valve.
Figure 4B:
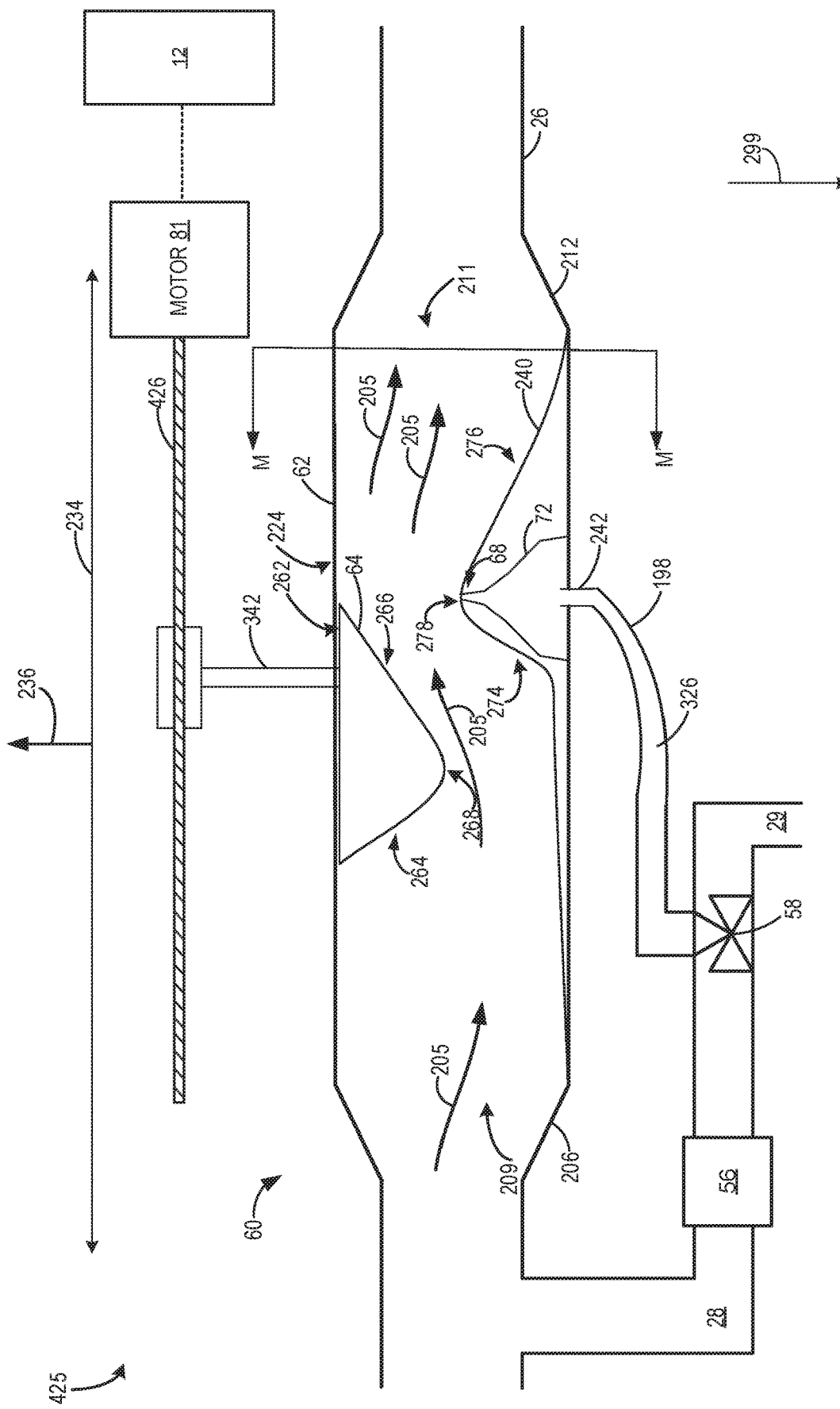
Figure 4C:
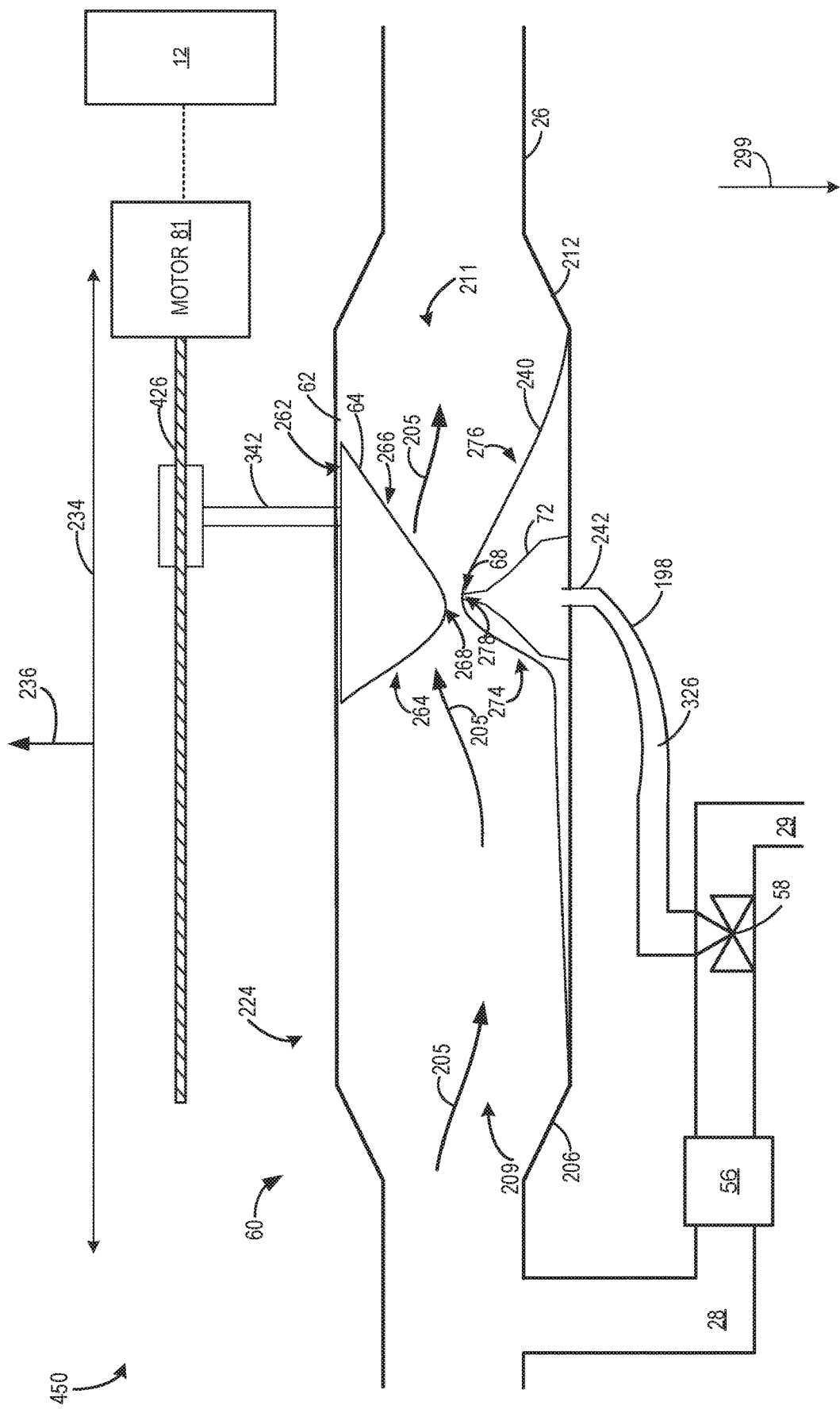
Figure 6A:
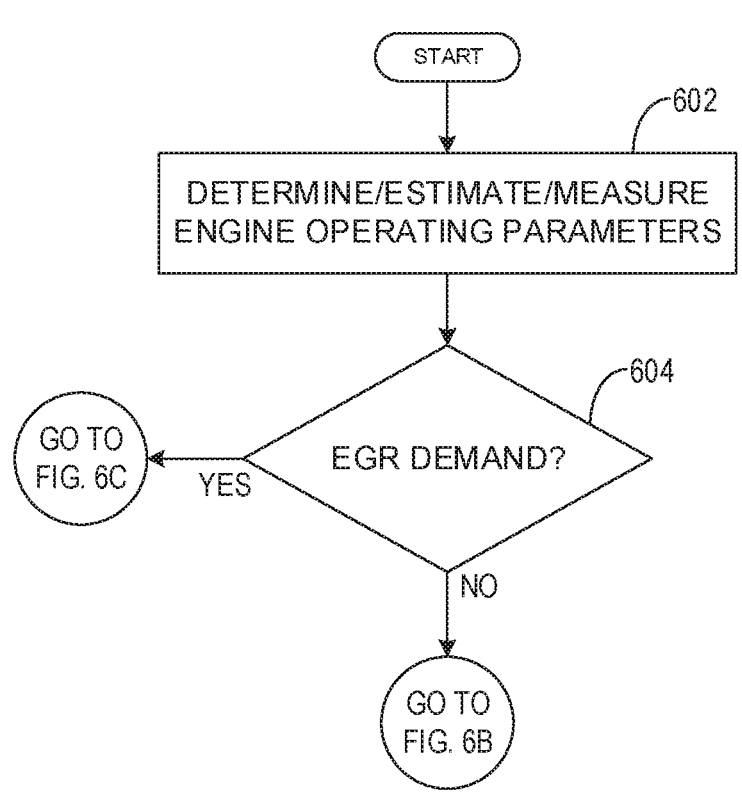

The following description relates to systems and methods for bypassing exhaust gas from an exhaust passage. A bypass valve comprising a slidable protrusion displaceable relative to a fixed flange may adjust an amount of exhaust gas bypassed from an exhaust passage. The bypassed exhaust gas may flow to a bypass passage comprising a heat exchanger, shown in FIG. 1. Thus, heat from the exhaust gas may be transferred to the heat exchanger, which may heat an engine coolant and/or heat operated device (e.g., a Peltier device and/or Rankine cycle). The slidable protrusion and the flange are similarly shaped on opposite sides of a valve body of the bypass valve, as shown in FIGS. 2A and 2B. A curvature of the protrusion and the flange are shown in FIG. 3. The bypass valve may generate less vacuum in a more open position of the protrusion, as shown in FIG. 4A. In the more open position, less exhaust gas may be bypassed from the exhaust passage to the bypass passage. The bypass valve may generate a vacuum between the protrusion and the flange when the protrusion is in a more closed position, as shown in FIG. 4C. In the more closed position, a greater amount of exhaust gas is bypassed from the exhaust passage to the bypass passage. In some positions of the three-way valve, at least a portion of the bypassed gas may be sucked back into the exhaust passage via vacuum generated from the venturi passage created between the protrusion and the flange. Additionally or alternatively, the protrusion may be moved to intermediate positions between the more open position and the more closed position, as shown in FIG. 4B. Exhaust flows through the bypass valve and the three-way valve coupling the bypass, exhaust gas recirculation, and recirculating passages are shown in FIGS. 5A, 5B, 5C, 5D, 5E, and 5F. A method for adjusting the three-way valve and the protrusion based on one or more engine conditions is shown in FIGS. 6A, 6B, and 6C.

FIGS. 1-5F show example configurations with relative positioning of the various components. If shown directly contacting each other, or directly coupled, then such elements may be referred to as directly contacting or directly coupled, respectively, at least in one example. Elements described as directly downstream or directly upstream of one another may be defined herein such that there are no intervening components between the two comparative elements. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Figure 1:
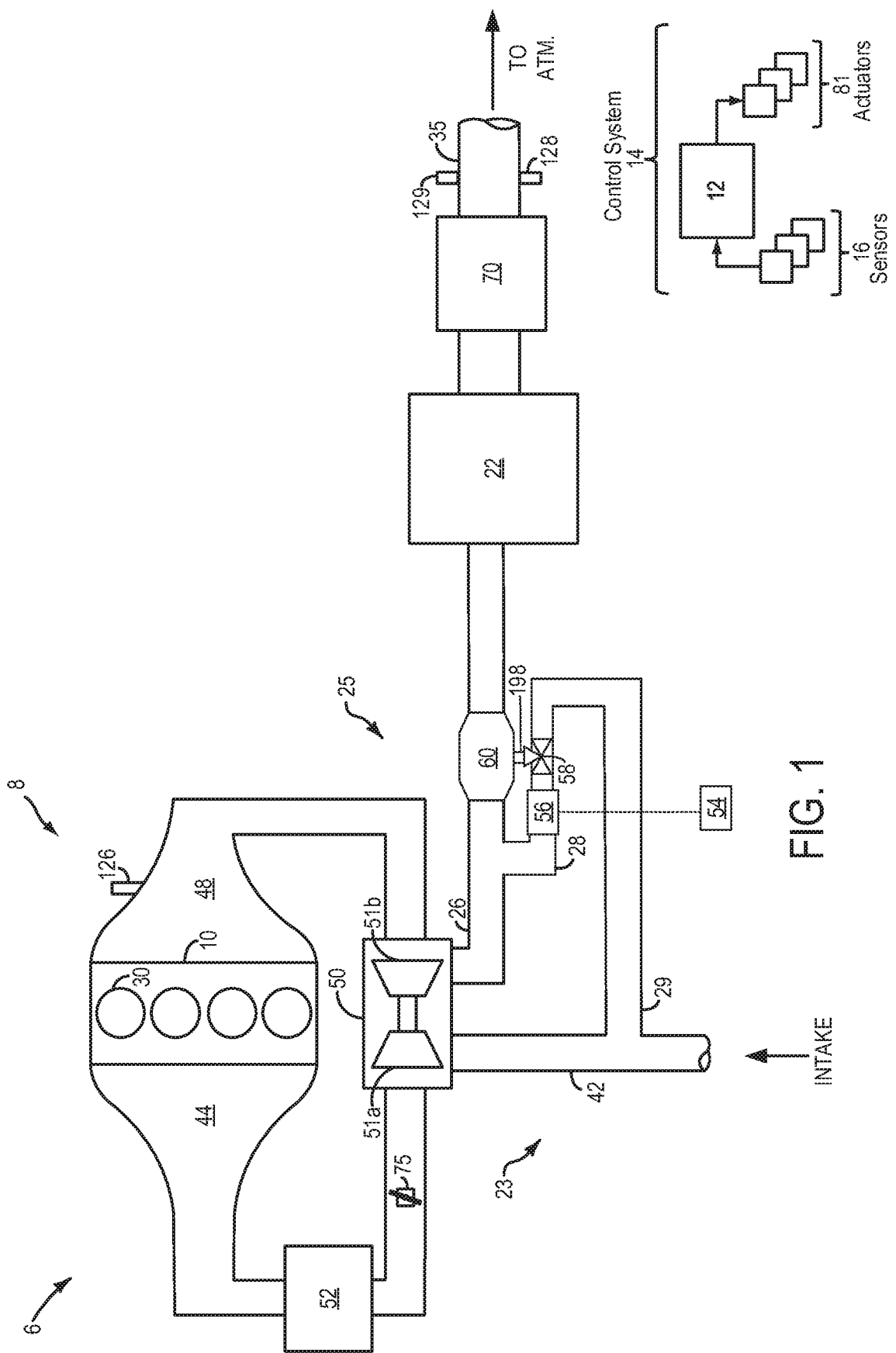
FIG. 1 shows an engine comprising a plurality of cylinders.

FIG. 1 shows a schematic depiction of a vehicle system 6. The vehicle system 6 includes an engine system 8 having an engine 10 having a plurality of cylinders 30. Engine 10 includes an engine intake 23 and an engine exhaust 25. Engine intake 23 includes a throttle 75 fluidly coupled to the engine intake manifold 44 via an intake passage 42. The engine exhaust 25 includes an exhaust manifold 48 eventually leading to a tailpipe 35 that routes exhaust gas to the atmosphere. Throttle 75 may be located in intake passage 42 downstream of a boosting device, such as turbocharger 50, or a supercharger, and upstream of after-cooler 52. As such, after-cooler 52 may be configured to reduce the temperature of the intake air compressed by the boosting device. Turbocharger 50 may include a compressor 51a, arranged between intake passage 42 and intake manifold 44. Compressor 51a may be at least partially powered by exhaust turbine 51b, arranged between exhaust manifold 48 and tailpipe 35.

Spark may be provided to combustion chambers 30 via spark plugs. The ignition system may further comprise an ignition coil (not shown) for increasing voltage supplied to the spark plugs. In other examples, such as a diesel, spark plugs are not included.

Engine exhaust 25 may include one or more emission control devices 70, which may be mounted in a close-coupled position in the exhaust. One or more emission control devices may include a three-way catalyst, lean NOx filter, SCR catalyst, etc. The engine exhaust 25 may further comprise PM retaining system 22 upstream of the emission control devices 70 and downstream of a bypass valve 60. Exhaust passage 26 is fluidly coupled to both the bypass valve 60 and the bypass passage 28. As such, the bypass valve 60 may control exhaust flow from the exhaust passage 26 to the bypass passage 28.

A heat exchanger 56 is located upstream of a three-way valve 58 along the bypass passage 28. The three-way valve 58 is coupled to the bypass passage 28, recirculating conduit 198, and EGR passage 29. During some conditions where the bypass valve 60 is at least partially closed and the three-way valve 58 is at least partially open, exhaust may flow from the exhaust passage 26, through the heat exchanger 56 and three-way valve 58, and into an EGR passage 29, where the exhaust gas is directed to the intake passage 42. The amount of EGR directed to the intake passage 42 may be adjusted by actuating one or more of the bypass valve 60 and three-way valve 58. The bypass valve 60, heat exchanger 56, and three-way valve 58 are described in more detail below.

The heat exchanger 56 is coupled to a heat receiving device 54. The heat receiving device 54 may be an engine coolant system, Peltier device, Rankine cycle device, and/or other suitable devices. The heat exchanger is configured to supply heat to the heat receiving device 54. Thus, heat captured from exhaust gas flowing through the heat exchanger 56 may be transferred to the heat receiving device 54. As such, engine coolant may be warmed-up by the heat exchanger 56, in one example. Additionally or alternatively, the heat exchanger may be used to power electrically operated components of the vehicle (e.g., an air conditioner) by providing the heat captured from the exhaust gas to the Peltier device and/or the Rankine cycle device.

The vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 (located in exhaust manifold 48), temperature sensor 128, and pressure sensor 129 (located downstream of emission control device 70). Other sensors such as pressure, temperature, air/fuel ratio, and composition sensors may be coupled to various locations in the vehicle system 6, as discussed in more detail herein. As another example, the actuators may include fuel injectors, two-way control valves, an EGR valve, and throttle 75. The control system 14 may include a controller 12 with computer-readable instructions for adjusting a position of the protrusion in the bypass valve and the three-way valve to bypass exhaust flow from the exhaust passage to one or more of the bypass passage and EGR passage. The controller may receive input data from the various sensors, process the input data, and trigger the actuators of FIG. 1 in response to the processed input data based on instruction or code programmed therein corresponding to one or more routines to adjust engine operation. Adjusting the bypass valve 60 may include actuating a moveable protrusion of the bypass valve 60 to adjust an amount of exhaust gas flowing out of the exhaust passage 26 to the bypass passage 28. Additionally or alternatively, the three-way valve 58 may also be actuated by controller 12. Thus, the bypass valve 60 and three-way valve 58 are electronic valves, in one example. It will be appreciated that the bypass valve 60 and three-way valve 58 may be mechanical, pneumatic, hydraulic, or other types of valves.

FIGS. 2A and 2B illustrate side perspective views of a first embodiment of a portion of exhaust passage 26 of FIG. 1 that includes bypass valve 60. As such, components previously introduced in FIG. 1 are numbered similarly in FIGS. 2A and 2B and may not be reintroduced.

FIG. 2A shows an exterior side perspective view 200 of bypass valve 60 incorporated in exhaust passage 26. FIG. 2B shows an interior side perspective view 250 of the bypass valve 60. Specifically, FIG. 2B shows the same side perspective view of bypass valve 60 shown in FIG. 2A, except that in FIG. 2B, the bypass valve 60 is illustrated as transparent, so as to expose the interior of the bypass valve 60. FIGS. 2A and 2B may therefore be described together in the description herein.

In the description herein, axis system 290 may be used to describe the relative positioning of components of the bypass valve 60. The axis system 290 may comprise an x-axis parallel to a horizontal direction, a y-axis parallel to a vertical direction, and a z-axis perpendicular to the horizontal and vertical directions. A "height" of the bypass valve 60 and/or its components may be used to define the extent of the components along the y-axis. Similarly a "length" of components of the bypass valve 60 may be used to refer to the physical extent of the components along the x-axis. The physical extent of components along the z-axis may be referred to as a "width." Arrow 299 indicates a direction of gravity. Cutting plane M-M' defines the cross-sectional view of the bypass valve 60 shown in FIGS. 4A-4C.

The bypass valve 60 may include a valve body 62 comprising four walls: a top wall 224 opposite a bottom wall 222, the top wall 224 and bottom wall 222 defining the height of the bypass valve 60, and two side walls 226 and 228, the side walls 226 and 228 defining the width of the bypass valve 60. Thus, the top wall 224 may be referred to as the "top" of the bypass valve 60. Similarly the bottom wall 222 may be referred to as the "bottom" of the bypass valve 60.

Front side wall 226, and back side wall 228 may be physically coupled to bottom wall 222 and top wall 224. As shown in the examples of FIGS. 2A and 2B, the walls 222, 224, 226, and 228 may be relatively flat and planar. As such, the throttle body 62 may be approximately rectangular. Specifically, the walls 222, 224, 226, and 228 may define a rectangular prism. However, it should be appreciated that in other examples, the walls 222, 224, 226, and 228 may be curved. As such, the shape and size of the bypass valve 60, and the shape, size, and configuration, of the walls 222, 224, 226, and 228 may be different than as depicted in FIGS. 2A and 2B. Further, it should be appreciated that in other examples, the valve body 62 may take on other prismatic shapes.

The walls 222, 224, 226, and 288 of the bypass valve 60 may be comprised of any suitable material such as plastic, metal, metal alloy, etc. Further, the walls 222, 224, 226, and 228 of the valve body 62 may be thin, so that they define a hollow interior of bypass valve 60. As such, intake gasses may flow through the interior of the valve body 62 to one or more exhaust aftertreatment devices (e.g., particulate filter 22 shown in FIG. 1), as shown by flow arrows 205 in FIGS. 2A and 2B. The walls 222, 224, 226, and 228 may be in sealing contact with one another along their edges, so that the interior portion of the bypass valve 60 is sealed off from an ambient atmosphere surrounding the valve body 62. Thus, exhaust gasses flow from an upstream first portion 202 of exhaust passage 26, through valve body 62, to downstream second portion 204 of exhaust passage 26.

A cross-sectional area of the valve body 62 may be greater than that of the exhaust passage 26. The cross-sectional area may be defined as a cross-section taken along a plane defined by the y- and z-axes. Thus, the cross-sectional area may be substantially perpendicular to exhaust gas flow through the exhaust passage 26. In other words, the volume included within a given length of the valve body 62 may be greater than that of the volume included within a similar length of the exhaust passage 26.

As such, the bypass valve 60 may further include an inlet cone 206 physically coupling the valve body 62 to the upstream first portion 202 of exhaust passage 26, and an outlet cone 212 physically coupling the valve body 62 to the downstream second portion 204 of exhaust passage 26. Thus, the cones 206 and 212 may physically couple the narrower exhaust passage 26 to the wider valve body 62. Therefore, an upstream first end 208, also referred to herein as inlet end 208 of inlet cone 206 may be smaller than a downstream second end 210, also referred to herein as outlet end 210. In other words, a cross-sectional area of the inlet cone 206 may be greater at the outlet end 210 than at the inlet end 208. Similarly, an upstream first end 214, also referred to herein as inlet end 214 of outlet cone 212 may be larger than a downstream second end 216, also referred to herein as outlet end 216. In other words, a cross-sectional area of the outlet cone 212 may be smaller at the outlet end 216 than at the inlet end 214.

In some examples, the diameter, and thus the cross-sectional area of the exhaust passage 26 may be approximately the same along the length of the exhaust passage 26. Thus, the size of inlet end 208 of the inlet cone 206 and outlet end 216 of the outlet cone 212 may be approximately the same and/or similar. However, it should be appreciated that in some examples, the diameter of the exhaust passage 26 may vary along its length, and as such, the outlet end 216 and inlet end 208 may not be the same shape and/or size. Further the cross-sectional area of the valve body 62 may be approximately the same along the length of the valve body 62. Thus, the size of the outlet end 210 of the inlet cone 206, and inlet end 214 of the outlet cone 212 may be approximately the same and/or similar. However, it should be appreciated that in other examples, the valve body 62 may not be rectangular and may take on another shape, where the cross-sectional area of the valve body 62 may vary along its length. In such examples, the inlet end 214 and outlet end 210 may be different in size and/or shape.

The upstream first end 208 of inlet cone 206 may be physically coupled to, and in sealing contact with, the upstream first portion 202 of exhaust passage 26. Further, the downstream second end 210 of inlet cone 206 may be physically coupled to, and in sealing contact with a downstream first end 209 of valve body 62, where the downstream first end 209 may be formed by upstream edges of the walls 222, 224, 226, and 228. Similarly, an upstream first end 214 of outlet cone 212 may be physically coupled to, and in sealing contact with, a downstream second end 211 of valve body 62, where the downstream second end 211 may be formed by downstream edges of the walls 222, 224, 226, and 228. Further, a downstream second end 216 of outlet cone 212 may be physically coupled to, and in sealing contact with the downstream second portion of exhaust passage 26.

The downstream first end 209 and downstream second end 211 of the valve body 62 are open. Thus, no walls may be formed at either the downstream first end 209 or the downstream second end 211. Further, upstream first end 208 and downstream second end 210 of inlet cone 206, and upstream first end 214 and downstream second end 216 of outlet cone 212 are open. Additionally, the interior of the cones 206 and 212 may be hollow, so that exhaust gas may flow relatively unobstructed through the cones 206 and 212. Thus, no walls may be formed at either the upstream first ends 208 and 214 or the downstream second ends 210 and 216. In this way, exhaust gas flows from upstream first portion 202 of exhaust passage 26 through the bypass valve 60, and on to downstream second portion 204 of exhaust passage 26. Specifically, exhaust gas may flow from upstream first portion 202 of exhaust passage 26 through inlet cone 206, into valve body 62, out through outlet cone 212, to downstream second portion 204 of exhaust passage 26. However, it should be appreciated that in other examples, inlet and outlet cones 206 and 212, respectively, may not be included in bypass valve 60. In such examples, the upstream first portion 202 of exhaust passage 26 may be directly physically coupled to downstream first end 209 of the valve body 62. Further, the downstream second portion 204 of the exhaust passage may be directly physically coupled to the downstream second end 211 of the valve body 62. As such, exhaust gasses may flow from upstream first portion 202 of exhaust passage 26 into the valve body 62 via the open downstream first end 209, and may flow out of valve body 62 to the downstream second portion 204 of the exhaust passage 26 via the open downstream second end 211.

Valve body 62 may additionally include a shaft 242 providing fluidic communication between the bypass passage 28 and interior of the valve body 62. Specifically, shaft 242 may be coupled to conduit 198, the conduit 198 coupled to the bypass passage 28, as described above with reference to FIG. 1. Thus, shaft 242 may extend through bottom wall 222 of the valve body 62. Shaft 242 may be substantially hollow, and as such gasses may flow there-through. As explained in greater detail below with reference to FIGS. 4A-4C, vacuum may be generated within the throttle body 62, drawing gasses from the bypass passage 28, through conduit 198, shaft 242, and into the valve body 62, in one example.

Focusing now on FIG. 2B, the exterior walls 222, 224, 226, and 228 of the valve body 62, and walls of the inlet cone 206 and outlet cone 212 are shown with dotted lines, exposing the interior components of the bypass valve 60 such as protrusion 64.

Protrusion 64 includes a sealing surface 262 that is flush with and/or in sealing contact with one of the walls 222, 224, 226, or 228 of the valve body 62. In the example shown in FIG. 2B, the sealing surface 262 is in sealing contact with the top wall 224. Thus, exhaust gas flowing through the valve body 62 may not flow between the sealing surface 262 and the top wall 224. Further, sealing surface 262 may maintain sealing contact with top wall 224 when the position of the protrusion 64 is adjusted (e.g., displaced) relative to the valve body 62. Thus, the protrusion 64 may be moved along the z-axis within the valve body 62, and the sealing surface 262 may therefore slide relative to the top wall 224 while maintaining sealing contact therewith. Further, the protrusion 64 may extend between the side walls 226 and 228. Specifically, protrusion 64 may be in sealing contact with the side walls 226 and 228, such that exhaust gas may not flow between protrusion 64 and the side walls 226 and 228.

Protrusion 64 may be curved and may extend inwards towards the interior and/or center of the valve body 62. Thus, the valve body 62 may narrow where the protrusion 64 is positioned. In other words, the cross-sectional flow area of the valve body 62 may be smaller at the protrusion 64 than at portions of the valve body 62 not including the protrusion 64. The protrusion 64 may include an upstream first surface 264 facing oncoming exhaust gas flow. Upstream first surface 264 may be angled relative to the direction of flow of exhaust gasses. A downstream second surface 266 may further be included in the protrusion 64, and may face away from oncoming exhaust gas flow. Downstream second surface 266 may also be angled relative to the direction of flow of exhaust gasses.

Thus, the upstream first surface 264 and the downstream second surface 266 may define the curvature of the protrusion 64, where an apex, tip, or ridge 268 of the protrusion 64 may be formed where the upstream first surface 264 and downstream second surface 266 meet.

An apex 268 of the protrusion 64 may be the most inwardly projecting portion of the protrusion 64, or in other words, the portion of the protrusion 64 positioned furthest from the top wall 224, to which the protrusion 64 is in sealing contact with.

Cross-sections of the protrusion 64 taken along the plane defined by y-axis and x-axis may be substantially the same along the z-axis. Thus, apex 268, may not be a single point, but may instead extend along the width of the protrusion 64, between the side walls 226 and 228. However, in some examples, it should be appreciated that the apex 268 may not extend between the side walls 226 and 228. Further, the apex 268 may in some examples be a single point.

As will be explained in greater detail below with reference to FIGS. 4A-4C, the protrusion 64 may be movable along the z-axis. Thus, the protrusion 64 may slide relative the valve body 62, between the downstream first end 209 and the downstream second end 211. As such, the protrusion 64 may move in a line substantially parallel to the direction of flow of exhaust gases (e.g., arrow 298). In other words, the protrusion 64 may be displaced downstream in the direction of intake gas flow, or may be displaced upstream in the opposite direction of intake gas flow. The protrusion 64 may be displaced along the axis 234 to generate vacuum between the protrusion 64 and an inwardly projecting flange 240 of the valve body 62.

In some examples, the protrusion 64 may be rotatable such that the protrusion 64 may be at least partially twisted with in the valve body 62. As shown, the first upstream surface 264 and the second downstream surface 266 face opposite the inlet cone 206 and the outlet cone 212, respectively. However, if the protrusion 64 were rotated, the protrusion 64 may be rotated 90° such that the first upstream surface 264 faces the side wall 226 and second downstream surface 266 faces the side wall 228. Thus, a width of the protrusion 64 may be less than a width of the valve body 62.

The flange 240 may be shaped similarly to the protrusion 64. As such the flange 240 may have a relatively flat, planar sealing surface 272, an upstream surface 274 facing oncoming intake gas flow, and a downstream surface 276 facing away from oncoming intake gas flow. The sealing surface 272 is physically coupled to and fluidically sealed to a wall of the valve body 62 opposite the wall to which the sealing surface 262 of the protrusion 64 is fluidically sealed to. Thus, in the example shown in FIG. 2B, the sealing surface 272 of the flange 240 is physically coupled to and in sealing contact with the bottom wall 222, since the bottom wall 222 is opposite the top wall 224. However, it should be appreciated that the orientations of the protrusion 64 and flange 240 may be reversed. Further the protrusion 64 and flange 240 may be positioned on opposite side walls 226 and 228 of the valve body 62. Thus, the protrusion 64 and flange 240 may be coupled to any of the walls 222, 224, 226, and 228 of the valve body 62 so long as they are positioned on opposite walls and are facing on another.

Sealing surface 272 may be in sealing contact with the bottom wall 222 of the valve body 62. In some examples, the flange 240 may be physically coupled to the valve body 62 via any suitable means such as welding, ultrasonic welding, injection molding, fastening, etc. The flange 240 may be integrally formed in the valve body 62, in some examples. As such, exhaust gasses may not flow between the sealing surface 272 and the bottom wall 222. Further, the flange 240 may extend between the side walls 226 and 228. Specifically, flange 240 may be in sealing contact with the side walls 226 and 228, such that exhaust gas may not flow between flange 240 and the side walls 226 and 228.

Flange 240 may be curved and may extend inwards towards the interior and/or center of the valve body 62. Thus, the valve body 62 may narrow where the flange 240 is positioned. In other words, the cross-sectional flow area of the valve body 62 may be smaller at the flange 240 than at portions of the valve body 62 not including the flange 240. The flange 240 may include an upstream first surface 274 facing oncoming exhaust gas flow. Upstream first surface 274 may be angled relative to the direction of flow of exhaust gasses. A downstream second surface 276 may further be included in the flange 240, and may face away from oncoming exhaust gas flow. Downstream second surface 276 may also be angled relative to the direction of flow of exhaust gasses. Thus, the upstream first surface 274 and the downstream second surface 276 may define the curvature of the flange 240, where an apex, tip, or ridge 278 of the flange 240 may be formed where the upstream first surface 274 and downstream second surface 276 meet.

Cross-sections of the flange 240 taken along the plane defined by y-axis and x-axis may be substantially the same along the z-axis. Thus, apex 278, may not be a single point, but may instead extend along the width of the protrusion 64, between the side walls 226 and 228. However, in some examples, it should be appreciated that the apex 278 may not extend between the side walls 226 and 228. Further, the apex 278 may in some examples be a single point.

As described above, the flange 240 may be physically coupled to the valve body 62. As such, the position of the flange 240 may be fixed relative to the valve body 62. In some examples, the flange 240 may be positioned more proximate the downstream first end 209 than the downstream second end 211. Thus, the apex 278 may be positioned more proximate the downstream first end 209 than the downstream second end 211. However, in other examples, such as the example shown in FIG. 2B, the flange 240 may positioned more proximate the downstream end 209 than the downstream first end 209. Thus, the apex 279 as shown in FIG. 2B may be more proximate the downstream second end 211 than the downstream first end 209.

Shaft 242 may be fluidically coupled to the interior of flange 240. Thus, shaft 242 may provide fluidic communication between the bypass passage 28 and the interior of the flange 240.

Specifically, shaft 242 may be coupled to conduit 198, the conduit 198 coupled to a three-way valve (e.g., three-way valve 58), as will be described below. Thus, shaft 242 may extend through bottom wall 222 of the valve body 62. Shaft 242 may be substantially hollow, and as such, gasses may flow there-through. Vacuum may be generated within the valve body 62, drawing gasses from the bypass passage 28, through conduit 198, shaft 242, and into the valve body 62 based on an actuation of the protrusion 64 in relation to the flange 240.

In some examples, additionally or alternatively, protrusion 64 may comprise an interior passage and shaft similar to interior passage 72 and shaft 242 of flange 240. The shaft of the protrusion may be fluidly coupled to a vacuum consumption device. As such, during conditions where the protrusion is in a more closed position (e.g., nearer to the flange 240), a portion of the vacuum generated in the exhaust passage 26 may be used to draw suck flow from the vacuum consumption device, thereby, replenishing its vacuum.

As will be explained in greater detail below with reference to FIGS. 4A-4C, by sliding (e.g., or rotating) the protrusion 64 along the z-axis, the distance between the protrusion 64 and the flange 240 may be varied. As the protrusion 64 and flange 240 are brought closer together by moving the protrusion 64, the narrowing of the valve body 62 may increase. Specifically, as the apex 268 of the protrusion 64 is brought closer to the apex 278 of the flange 240, the cross-sectional flow area defined between the apex 268 and apex 278 may decrease. Thus, as the distance between the protrusion 64 and flange 240 decreases, a narrowing of the valve body 62 increases, and a cross-sectional flow area of the valve body 62 decreases. Therefore, by moving the protrusion 64 towards the flange 240, a Venturi effect may be created between the apex 268 of the protrusion 64 and the apex 278 of the flange 240. Thus, a vacuum may be generated between the apexes 268 and 278 which may be used to draw in gases from the conduit 198 based on a position of a valve in the bypass passage 28. Additionally, when the protrusion 64 is actuated toward the flange 240, exhaust gas from the upstream first portion 202 of the exhaust passage 26 is directed to the bypass passage 28. Specifically, as explained in greater detail below with reference to FIG. 3, gasses may be routed from the exhaust passage 26 to the bypass passage 28 outside of the exhaust passage 26. Gas in the bypass passage 28 may be directed to an intake manifold, as exhaust gas recirculation (EGR), and/or to the interior of the valve body 62 via the conduit 198. Other example exhaust flows are described below.

Turning now to FIG. 3, it shows an internal side perspective view 300 of the valve body 62. As such, components previously introduced may be similarly numbered in subsequent figures. FIG. 3 shows the internal structure of the protrusion 64, including a hollow interior passage 72. The hollow interior passage 72 may fluidly couple the shaft 242 to the opening 68. As such, gases may flow from the interior of the valve body 62 to shaft 242 based on one or more of a three-way valve position and protrusion 64 position. Conversely, gases may flow from the shaft 242 to the hollow interior passage 72 based on one or more of a three-way valve position and protrusion position. Interior passage 72 may define a volume of the flange 240. Portions of the flange 240 not including the interior passage 72 may not be hollow. Shaft 242 may extend into the interior of the passage 72 from outside the valve body 62.

A front side surface 265 of the protrusion 64 may be in sealing contact with the front side wall 226 of the valve body 62. Further a back side surface 267 of the protrusion 64 may be in sealing contact with the back side wall 228 of the valve body 62. Thus, as explained above the protrusion 64 may extend between the side walls 226 and 228.

Specifically, the upstream first surface 264 may be orientated at approximately a first angle θ1, relative to the sealing surface 262 and/or the direction of exhaust gas flow in the valve body 62, and downstream second surface 266 may be orientated at approximately a second angle θ2, relative to the sealing surface 262 and/or the direction of exhaust gas flow in the valve body 62. As shown in the example of FIG. 2B, first angle θ1 may be larger than second angle θ2. In other words, the slope of the upstream first surface 264 may be greater than the slope of the downstream second surface 266. However, it should be appreciated that in other examples, the angles θ1 and θ2 may be approximately the same, and therefore the protrusion 64 may be relatively symmetric about an apex 268 of the protrusion 64. In still further examples, second angle θ2 may be larger than first angle θ1, and as such the slope of the upstream first surface 264 may be less than the slope of the downstream second surface 266.

Similarly, a front side surface 275 of the flange 240 may be in sealing contact with the front side wall 226 of the valve body 62. A back side surface 277 of the flange 240 may be in sealing contact with the back side wall 228 of the valve body 62. Thus, as explained above the flange 240 may extend between the side walls 226 and 228.

Specifically, the upstream first surface 274 may be orientated at approximately a first angle θ3, relative to the sealing surface 272 and/or the direction of exhaust gas flow in the valve body 62, and downstream second surface 276 may be orientated at approximately a second angle θ4, relative to the sealing surface 272 and/or the direction of exhaust gas flow in the valve body 62. As shown in the example of FIG. 2B, first angle θ3 may be larger than second angle θ4. In other words, the slope of the upstream first surface 274 may be greater than the slope of the downstream second surface 276. However, it should be appreciated that in other examples, the angles θ3 and θ4 may be approximately the same, and therefore the flange 240 may be relatively symmetric about an apex 278 of the flange 240. In still further examples, second angle θ4 may be larger than first angle θ3, and as such the slope of the upstream first surface 274 may be less than the slope of the downstream second surface 276.

The apex 278 of the flange 240 may be the most inwardly projecting portion of the flange 240, or in other words, the portion of the flange 240 positioned farthest from the bottom wall 222, to which flange 240 is coupled.

The opening 68 may be formed at the apex 278 of the flange 240. However, it should be appreciated that in other examples, the opening 68 may be formed at another position on either the upstream first surface 264 or the downstream second surface 266. The opening 68 may therefore extend from the front side surface 265 to the back side surface 267 of the flange 240. Said another way, walls defining the interior passage 72 may converge with exterior walls of the flange 240 forming the first surface 274 and second surface 276 to form the opening 68. In one example, the first surface 274 and the second surface 276 are the only walls separating the hollow interior passage 72 from an interior of the bypass valve 60. Thus, the opening 68, may be a slit in the flange 240 formed by the convergence of the hollow interior passage 72 with exterior walls of the flange 240, for example first and second surfaces 274 and 276, respectively. The opening 68 may extend along the width of the flange 240. However, in other examples, it should be appreciated that the opening may not extend between the side surfaces 275 and 277. In still further examples, the opening may comprise a single aperture or plurality of apertures. The shape, size, and/or distribution of the apertures may be varied. For example, the apertures may be circular, rectangular, triangular, geometric, or non-geometric.

As can be seen in the example of FIG. 3, the slidable projection is located on the top wall and the fixed protrusion is located on the bottom wall, and where the slidable projection and the fixed protrusion comprise respective upstream first surfaces facing incoming exhaust gas flow, the first surfaces oriented at respective first angles with respect to a direction of incoming exhaust gas flow, and where the slidable projection and the fixed protrusion each comprise respective downstream second surfaces facing away from incoming intake gas flow, the second surfaces oriented at respective second angles with respect to the direction of incoming exhaust gas flow, where the second angles are less than the respective first angles. Exhaust gas flow may be constricted as it flows between the protrusion 64 and the flange 240. Exhaust gasses flow from left to right in FIG. 3, as shown by the exhaust gas flow arrows 205. Thus, exhaust gases flow over the first surface 274 and apex 278 of the flange 240, and under the first surface 264 and apex 268 of the protrusion 64. Due to the narrowing of the valve body 62 between the flange 240 and protrusion 64, a portion of exhaust gas upstream of the bypass valve 60 may be diverted into the bypass passage 28. Additionally, vacuum may be generated at the opening 68 of the flange 240 which may be used to draw in gases from the conduit 198 as shown by flow arrows 326. In one example, exhaust gas may be bypassed from the exhaust passage 26 to the bypass passage 28, where the bypassed exhaust gas flows through a heat exchanger located in the bypass passage 28 upstream of an EGR valve. Based on a position of the EGR valve, exhaust gas may flow to one or more of an intake manifold or the conduit 198. Exhaust gas in the conduit 198 is returned to the interior of the valve body 62. As described below with reference to FIGS. 4A-4C, the position of protrusion 64 may be adjusted to vary the amount of vacuum generated at the opening 68 of the flange 240 along with the amount of exhaust gas bypassed from the exhaust passage 26. A motor may be physically coupled to the protrusion 64 via shaft 342 and as such, the motor may move the protrusion 64 along the x-axis as explained in greater detail below with reference to FIGS. 4A-4C. Shaft 342 may be physically coupled to the protrusion 64, and may extend out to the exterior of the valve body 62. The shaft may in some example be coupled to the portion of the protrusion 64 not including the hollow interior passage 72. Alternatively, the motor may rotate protrusion 64.

In this way, the shaft 242 is coupled to the flange 240 is fixed along a point of the valve body 62. Thus, as the protrusion 64 moves in upstream and downstream directions parallel to a direction of intake air flow, the shaft 242, opening 68, and flange 240 do not move. The hollow interior passage 72 located inside of the flange 240 may be supplied vacuum as the protrusion 64 is actuated toward the flange 240 in the downstream direction. An amount of exhaust flow may flow from the conduit 198, into the hollow interior passage 72, out the opening 68, and out the flange 240 to mix with the exhaust flow arrows 205. The amount of gas flow flowing into the bypass passage 28 may increase the protrusion 64 approaches (gets closer to) the fixture 240. Additionally or alternatively, the amount of vacuum generated by the bypass valve 60 increases as the protrusion 64 approaches the fixture 240, where the vacuum may draw air from the conduit 198 into the hollow interior passage 72 during some positions of an EGR valve. In one example, a maximum amount of vacuum may be generated when the apex 278 of the flange 240 aligns with the apex 268 of the protrusion 64 along a common vertical axis. Additionally or alternatively, in one example, a maximum amount of exhaust gas is bypassed from the exhaust passage 26 to the bypass passage 28 when the apex 278 of the flange 240 aligns with the apex 268 of the protrusion 64 along the common vertical axis. In one embodiment, both the protrusion 64 and the flange 240 comprise hollow interior passages, where the protrusion 64 and the flange may be fluidly coupled to the same or different components. As such, the protrusion 64 may be fluidly coupled to a vacuum consumption device, wherein the protrusion 64 may replenish a vacuum of the device as the protrusion 64 is actuated toward the flange, while exhaust gas is diverted from the exhaust passage to the bypass passage.

Turning now to FIGS. 4A-4C, they show example positions to which the protrusion 64 may be adjusted. Thus, FIGS. 4A-4C, show the relative positioning of the protrusion 64 within valve body 62, as the protrusion 64 is adjusted to different example positions. FIGS. 4A-4C show cross-sectional views of protrusion 64 positioned within valve body 62, where the cross-sectional plane is taken along line M-M' of FIGS. 2A-2B. FIG. 4A, shows the protrusion 64 in an open first position. FIG. 4C shows the protrusion 64 in a closed second position, and FIG. 4B shows the protrusion 64 in an intermediate third position, the third position being a position between the open first position and the closed second position. More air may flow through valve body 62, when the protrusion 64 is in the intermediate third position than in the closed second position, and more air may flow through valve body 62 when the protrusion 64 is in the open first position than in the intermediate third position, as shown by the number of arrows 205. Thus, exhaust flow through the bypass valve 60 may increase with increasing deflection towards the open first position, away from the closed second position. Note that components previously introduced in FIGS. 1-3 are numbered similarly in FIGS. 4A-4C, and may not be reintroduced.

Thus, in FIGS. 4A-4C, protrusion 64 may be shown displaced along the horizontal direction, according to arrow 299 depicting a direction of gravity, in different positions. As such, the distance between the protrusion 64 and the flange 240, may vary depending on the position of the protrusion 64. Specifically, when adjusting the bypass valve 60 to a more open position, the protrusion 64 may be moved closer to the downstream first end 209 of the valve body 62, and away from the downstream second end 211 of the valve body 62 and flange 240. In this way, an opening in the bypass valve 60 formed between the protrusion 64 and flange 240 may be increased, and airflow there-through may correspondingly increase. Further, when adjusting the bypass valve 60 to a more closed position, the protrusion 64 may be moved closer to the downstream second end 211 of the valve body 62 and flange 240, and away from the downstream first end 209 of the valve body 62. In this way, an opening in the bypass valve 60 formed between the protrusion 64 and flange 240 may be reduced, and airflow there-through may correspondingly decrease. As explained above, as the bypass valve 60 is adjusted towards the more closed position, a Venturi effect created between the protrusion 64 and the flange 240 may increase while simultaneously increasing an amount of exhaust gas bypassed from exhaust passage 26 to bypass passage 28. As such, a larger vacuum may be generated between the protrusion 64 and the flange 240 and more exhaust gas is diverted from the exhaust passage 26 to the bypass passage 28, as the bypass valve 60 is adjusted towards the more closed position.

Since exhaust gas flow through the valve body 62 may be substantially parallel to horizontal, movement of the protrusion 64 may be substantially parallel to exhaust gas flow in the valve body 62. Exhaust gas flow through the valve body 62 is shown flowing from left to right in FIGS. 4A-4C. As such, moving the protrusion 64 downstream may refer to moving the protrusion 64 in the same or similar direction as exhaust gas flow (from left to right in FIGS. 4A-4C). Conversely, moving the protrusion 64 upstream may refer to moving the protrusion 64 in the opposite direction of exhaust gas flow (from right to left in FIGS. 4A-4C). As such, when the protrusion 64 is moved towards a more closed position, the protrusion 64 may be displaced in a direction approximately exactly concurrent the direction of flow of exhaust gases in the valve body 62. Conversely, when the protrusion 64 is moved towards a more open position, the protrusion 64 may be displaced in a direction approximately exactly opposite or opposing with the direction of flow of exhaust gases in the valve body 62 (e.g., downstream). Since the flange 240 is shown positioned more proximate the downstream second end 211 than the downstream first end 209 of the valve body 62, as the protrusion 64 is displaced downstream, the protrusion 64 may be moved closer to the flange 240. Conversely, as the protrusion 64 is moved upstream, the distance between the protrusion 64 and the flange 240 may increase.

The position of the protrusion 64 may be adjusted by a motor 81. Specifically, motor 81 may be physically coupled to protrusion 64 for moving the protrusion 64 within the valve body 62. Motor 81 may be in electrical communication with controller 12, and may adjust the position of the protrusion 64 based on signals received from the controller 12. As an example, in response to an increase in demand for exhaust gas recirculation, the controller 12 may send signals to the motor 81 for adjusting the position of the protrusion 64 to a more closed position to increase an amount of exhaust gas bypassed from the exhaust passage 26 to the bypass passage 28 by increasing a restriction in the exhaust passage 26.

Motor 81 may be any suitable actuator such as hydraulic, electric, pneumatic, electromechanical, etc. Further, motor 81 may be physically coupled to protrusion 64 via shaft 342 and/or actuator rod 426. Thus, motor 81 may be a linear actuator, and may displace the protrusion 64 along the horizontal direction, upstream and downstream within the valve body 62. In some examples, the motor 81 may be directly physically coupled to actuator rod 426, and actuator rod 426 may in turn be directly physically coupled to shaft 342, which may in turn be directly physically coupled to protrusion 64. The actuator rod 426 may in some examples comprise a plunger or piston that is movable along the horizontal direction. As such, as the motor 81 displaced the actuator rod 426 along the horizontal axis, the protrusion 64 may be displaced as well since it may be physically coupled to the rod 426 via shaft 342. However, in other examples, such as the examples shown in FIGS. 4A-4C, the actuator rod 426 may be threaded and rotation of the actuator rod 426 may in turn cause a displacement of the shaft 342 and protrusion 64 along the horizontal direction. Thus, rotational motion generated by the motor 81 may be converted in linear motion of the protrusion 64. Further, it should be appreciated that other examples of linear actuation of the protrusion 64 by the motor 81 are possible. Additionally or alternatively, examples of rotational actuation of the protrusion are possible without departing from the scope of the present disclosure. In one example, the protrusion may be rotatable in a 360° range, where the protrusion is in the open first position at a rotation corresponding to 0° and in the closed second position at a rotation corresponding to 90°. Further, in some examples, motor 81 may be directly physically coupled to shaft 342, and rod 426 may not be included.

Turning now to FIG. 4A, it shows an embodiment 400 where protrusion 64 is in the open first position. Exhaust gas flow through the valve body 62 may be greater with the protrusion 64 in the open first position than any other position. Thus, the position of the protrusion 64 shown in FIG. 4A may be referred to as a fully open position. Protrusion 64 may not overlap with the flange 240. More precisely, a given cross-section of the valve body 62 taken along the direction of gravity (arrow 299), may not include both the flange 240 and protrusion 64, when the protrusion 64 is adjusted to the open first position. In other words, no portion of the protrusion 64 may be positioned over any portion of the flange 240. However, in other examples, some overlap between the protrusion 64 and the flange 240 may exist in the open first position. As such, a narrowing of the valve body 62 may be less in the open first position, than more closed positions, and exhaust flow through the valve body 62 may be relatively unobstructed.

FIG. 4B shows an embodiment 425, where the protrusion 64 is displaced downstream in the valve body 62 along the x-axis, relative to the open first position shown in FIG. 4A to an intermediate third position. As such, exhaust flow through the valve body 62 may be less in the intermediate third position than in the open first position, while exhaust flow bypassed from the exhaust passage 26 to the bypass passage 28 may be more in the intermediate third position than in the open first position. However, an amount of vacuum generated at the apexes 268 and 278 may be greater at the third position than the open first position. Thus, the vacuum may be used to recirculate at least a portion of exhaust gas in the bypass passage 28 back to the valve body 62, as will be described below in FIGS. 5D and 5E. In the intermediate third position, the protrusion 64 may overlap with the flange 240. That is, a given cross-section of the valve body 62 taken along the y-axis, may include both the flange 240 and protrusion 64, when the protrusion 64 is adjusted to the intermediate third position. In other words, portions of the protrusion 64 may be positioned over portions of the flange 240. However, in other examples, the protrusion 64 may not overlap with the flange 240 in the intermediate third position.

FIG. 4C shows an embodiment 450, where the protrusion 64 is displaced downstream in the valve body 62 along the x-axis, relative to the open first position and intermediate third position shown in FIGS. 4A and 4B, to the closed second position. As such exhaust gas flow through the valve body 62 may be less in the closed second position than in the open first position and intermediate third position, while the exhaust gas diverted from the exhaust passage 26 to the bypass passage 28 is more in the closed second portion than in the open first position and intermediate third position. However, an amount of vacuum generated at apexes 268 and 278 may be greater at closed second position than the open first position and intermediate third position. Thus, an amount of exhaust gas recirculated back to the valve body 62 from the bypass passage 28 may be greater in the closed second position than the open first position and intermediate third position.

In the closed second position, the protrusion 64 may fully overlap with the flange 240. That is, substantially all cross-sections of the protrusion 64 taken along the y-axis, may include both the flange 240 and protrusion 64, when the protrusion 64 is adjusted to the closed second position. In other words, the protrusion 64 may be positioned directly over the flange 240, so that the tip 268 of the protrusion 64, and the tip 278 of the flange 240 are aligned with one another along the y-axis. As shown in FIG. 4C, the apexes 268 and 278 may be separated from one another may a narrow space in the closed second position, so that exhaust gases may still flow through the exhaust passage 26. Thus, the protrusion 64 and flange 240 may not be in physical contact with one another in the closed second position, so that some amount of air may continue to flow through the valve body 62 to generate vacuum as it flows through the constriction formed by the protrusion 64 and flange 240 in the closed second position.

However, it should be appreciated that in other examples, the protrusion 64 and flange 240 may be in sealing contact with one another when the protrusion 64 is adjusted to the closed second position. In such examples, exhaust flow through the valve body 62 may be substantially zero. Thus, in some examples, the protrusion 64 may be adjusted to a fully closed position, to cut off exhaust flow to the portion of the exhaust passage 26 downstream of the valve body 62. Additionally or alternatively, the opening 68 may be positioned on the downstream surface 276 such that exhaust gas from the bypass passage 28 may flow back to the valve body 62 even when the protrusion is in sealing contact with the flange 240.

Thus, as the protrusion 64 is adjusted towards a more closed position, more proximate the flange 240, airflow through the valve body 62 may decrease, vacuum generated between the protrusion 64 and the flange 240 may increase, and an amount of exhaust gases flowing from the exhaust passage 26 to the bypass passage 28 may increase. Conversely, as the protrusion 64 is adjusted towards a more open position, further away from the flange 240, exhaust gas flow through the valve body 62 may increase, vacuum generated between the protrusion 64 and the flange 240 may decrease, and an amount of exhaust gas flowing from the exhaust passage 26 to the bypass passage 28 may decrease. In this way, exhaust flow to the bypass passage 28 may be adjusted by adjusting the position of the protrusion 64.

In one example, an amount of cooled exhaust gas flowing back to the valve body 62 may be adjusted by adjusting the protrusion 64 to and away from the flange 240 in the intermediate third position. As an example, by moving the protrusion 64 closer to the flange 240 in the intermediate third position, more cooled exhaust gas flows back to the valve body 62. Thus, a temperature of exhaust gas in the exhaust passage 26 may be adjusted by adjusting the protrusion 64. Additionally or alternatively, an amount of cooled EGR flowing to the engine may be adjusted by adjusting the protrusion 64 to and away from the flange 240 in the intermediate third position. As an example, by moving the protrusion 64 closer to the flange 240, more cooled EGR flows to the engine. Thus, the protrusion 64 moving away from the flange 240 results in less cooled EGR flowing to the engine. In this way, a greater range of control over the temperature of exhaust gas flowing to aftertreatment devices and EGR flowing to the engine is achieved by the bypass valve 60 and the three-way valve.

Turning now to FIGS. 5A, 5B, 5C, 5D, 5E, and 5F they show example exhaust gas flows based on a position of the protrusion 64 relative to the flange 240. Furthermore, the FIGS. 5A, 5B, 5C, 5D, 5E, and 5F depict a position of the three-way valve 58 for adjusting EGR and/or recirculated exhaust gas. FIGS. 5A and 5B show the protrusion 64 in the open first position, as shown in FIG. 4A, along with example exhaust flows through one or more of the exhaust passage 26, bypass passage 28, and EGR passage 29. FIGS. 5C, 5D, and 5E show the protrusion 64 in the closed second position, as shown in FIG. 4C, along with example exhaust flows through one or more of the exhaust passage 26, bypass passage 28, and EGR passage 29. FIG. 5F shows the protrusion 64 in the intermediate third position, as shown in FIG. 4B, along with example exhaust flows through one or more of the exhaust passage 26, bypass passage 28, and EGR passage 29. The exhaust passage 26 is fluidly coupled to a first end of the bypass passage 28 upstream of the bypass valve 60. Three-way valve 58 is located at a second end of the bypass passage 28, where the three-way valve 58 is configured to adjust an amount of exhaust gas flow to one or more of the recirculation conduit 198 and the EGR passage 29. The bypass passage 28 further comprises a heat exchanger 56 configured to sequester heat from exhaust gas. The heat may be used to heat coolant and/or to power an electrically operated component coupled to a Peltier device.

Turning now to FIG. 5A, it shows an embodiment 500 comprising the protrusion 64 in the open first position. As described above, a space between the protrusion 64 and the flange 240 in the open first position is greater than the intermediate third position and the closed second position. Additionally, the three-way valve 58 is shown with a bypass portion 502, a recirculating portion 504, and an EGR portion 506 in closed positions (e.g., a completely closed position of the three-way valve 58), as shown by circles in the portions of the three-way valve 58. As such, a larger portion of exhaust gas may flow directly through the exhaust passage 26 than in the bypass passage 28 and the EGR passage 29, as shown by exhaust flow arrows 205. In one example, substantially no exhaust gas flows into the bypass passage 28 and the EGR passage 29 when the three-way valve 58 is completely closed. Additionally or alternatively, exhaust gas may fill a volume of the bypass passage 28 while being prevented from flowing to the EGR passage 29 and the recirculating conduit 198 when the three-way valve 58 is completely closed. In this way, exhaust gas flows directly through the exhaust passage 26 to the after-treatment device, without cooling exhaust gas via the heat exchanger 56 and EGR is not provided to the intake manifold.

In one example, the protrusion 64 may be in the open first position with the three-way valve 58 in the completely closed position at a cold start. In this way, hot exhaust gas may remain in the exhaust passage 26, thereby allowing aftertreatment devices to reach a desired temperature. Additionally or alternatively, the protrusion 64 may be in the open first position with the three-way valve 58 in the completely closed position when an engine operating temperature is at a desired temperature and EGR is not desired.

Turning now to FIG. 5B, it shows an embodiment 515 comprising the protrusion 64 in the open first position, similar to the embodiment 500 shown in FIG. 5A. Thus, the space between the protrusion 64 and the flange 240 is still larger than the space in the closed second position and intermediate third position. As such, a larger portion of exhaust gas may flow directly through the exhaust passage 26 than in the bypass passage 28 and the EGR passage 29. As shown, substantially no exhaust gas enters the bypass passage 28 when the protrusion 64 is in the open first position. An engine (e.g., engine 10 shown in FIG. 1) may demand EGR when the protrusion is in the open first position. Thus, the recirculating 504 and EGR 506 portions of the three-way valve 58 are open while bypass portion 502 is closed. By doing this, exhaust gas may flow through the interior passage 72 of the flange 240, into the conduit 198, through the open recirculating portion 504 of the three-way valve 58, through the EGR portion 506 of the three-way valve 58, and into the EGR passage 29 to the engine. In one example, intake manifold vacuum may be supplied through the EGR passage 29, open recirculating and EGR portions 504 and 506 of the three-way valve 58, and to the interior passage 72, which is fluidly coupled to the exhaust passage 26. By doing this, EGR may flow to the engine when the protrusion 64 is in the open first position, without flowing the EGR through the heat exchanger 56 in the bypass passage 28. As such, EGR flowing to the engine is hotter than EGR flowing through the heat exchanger 56 before flowing to the engine.

As an example, when the protrusion 64 is in the open first position, the bypassing portion 502 is closed, the recirculating portion 504 is open, and the EGR portion 506 is open, the engine may be demanding hot EGR gas. For example, this may occur when ambient temperatures are low. Thus, the hot EGR may preserve a combustion stability, compared to cooler EGR, while simultaneously reducing emissions. It will be appreciated that other engine conditions may result in the protrusion 64 being in the open first position, along with hot EGR gas flowing from the exhaust passage 26 to the engine.

Turning now to FIG. 5C, it shows an embodiment 530 comprising the protrusion 64 in the closed second position. As described above, a space between the protrusion 64 and the flange 240 in the closed second position is less than the intermediate third position and the open first position. Thus, a smaller portion of exhaust gas may flow directly through the exhaust passage 26 in the closed second position than in the intermediate third position and the open first position. Due to this impedance of exhaust gas flow, a larger portion of exhaust gas may flow from the exhaust passage 26 into the bypass passage 28 than in the intermediate third position and the open first position. In the embodiment 530, the bypass portion 502 and EGR portion 506 of the three-way valve 58 are open. This allows exhaust gas from the exhaust passage 26 to flow through the heat exchanger 56 before flowing to the engine as cooled EGR. Additionally, recirculation portion 504 of the three-way valve 58 is maintained in a closed position such that cooled exhaust gas is not recirculated back to the exhaust passage 26. Thus, exhaust gas in the exhaust passage 26 is hotter than exhaust gas in the EGR passage 29. In this way, exhaust gas in the exhaust passage 26 may heat-up or maintain an operating temperature of one or more exhaust aftertreatment devices while the cooled EGR may decrease a combustion temperature of the engine to a lower temperature than uncooled EGR (e.g., EGR shown in embodiment 515 shown in FIG. 5B).

For example, when protrusion 64 is in the closed second position, the bypass portion 502 is open, the recirculating portion 504 is closed, and the EGR portion 506 is open, cooled EGR gas flows to the engine. As such, less exhaust gas flows through the exhaust passage 26. This may be in response to an engine temperature being greater than a desired engine temperature while exhaust aftertreatment devices are substantially equal to a desired operating temperature. Furthermore, the heat captured by the heat exchanger 56 from the exhaust gas may be utilized to power an electrical component of the vehicle (e.g., an A/C unit) by directing the captured heat to a Peltier device (e.g., Peltier device 60 shown in FIG. 1).

Turning now to FIG. 5F, it shows an embodiment 575 comprising the protrusion in an intermediate third position, similar to embodiment 425 shown in FIG. 4B. As described above, a space between the protrusion 64 and the flange 240 in the intermediate third position is less than the open first position and greater than the closed second position. Thus, a smaller portion of exhaust gas may flow through the exhaust passage 26 in the intermediate third position than the open first position while a greater portion of exhaust gas may flow through the exhaust passage 26 in the intermediate third position than the closed second position. As such, a larger portion of exhaust gas may flow from the exhaust passage 26 into the bypass passage 28 in the intermediate third position than in the open first position while a smaller portion of exhaust gas may flow from the exhaust passage 26 into the bypass passage 28 in the intermediate third position than in the closed second position. In the embodiment 575, the bypass portion 502 and EGR portion 506 of the three-way valve 58 are open. This allows exhaust gas from the exhaust passage 26 to flow through the heat exchanger 56 before flowing to the engine as cooled EGR. Additionally, recirculation portion 504 of the three-way valve 58 is maintained in a closed position such that cooled exhaust gas is not recirculated back to the exhaust passage 26.

Thus, embodiment 575 is substantially similar to embodiment 530, with the only difference being the position of the protrusion 64. Since the embodiment 575 depicts the protrusion 64 in the intermediate third position, less exhaust gas is bypassed from the exhaust passage 26 to the bypass passage 28 than in the closed second position shown in embodiment 530. As such, less cooled EGR gas is provided to the engine in the intermediate third position than in the closed second position. In this way, the bypass valve 60 may be used to adjust an amount of EGR delivered to the engine.

Turning now to FIG. 5D, it shows an embodiment 545 comprising the protrusion 64 in the closed second position. As described above, a space between the protrusion 64 and the flange 240 in the closed second position is less than the intermediate third position and the open first position. Thus, a smaller portion of exhaust gas may flow directly through the exhaust passage 26 in the closed second position than in the intermediate third position and the open first position. Due to this impedance of exhaust gas flow, a larger portion of exhaust gas may flow from the exhaust passage 26 into the bypass passage 28 than in the intermediate third position and the open first position. In the embodiment 545, the bypass portion 502, recirculation portion 504, and EGR portion 506 of the three-way valve 58 are open such that exhaust gas flowing through the bypass passage 28 is cooled and either returned to the exhaust passage 26 or delivered to the engine. By recirculating cooled exhaust gas back to the exhaust passage 26, the cooler exhaust gas may maintain and/or decrease a temperature of one or more aftertreatment devices. Vacuum generated between the protrusion 64 and the flange 240 may draw cooled exhaust gas from the bypass passage 28 to the interior passage 72 via the conduit 198. For example, particulate filter regenerations may reach high regeneration temperatures, which may degrade the particulate filter. By flowing cooled exhaust gas back to the exhaust passage 26, the cooled exhaust gas may mitigate and/or prevent degradation of the particulate filter. Furthermore, by flowing cooled EGR to the engine, an engine combustion temperature may be more quickly reduced than uncooled EGR, which may decrease $NO_x$ output. In embodiment 545, less EGR may be delivered to the engine compared to the embodiment 530 shown in FIG. 5C. However, an amount of exhaust gas flowing through the bypass valve 60 is greater in embodiment 545 than embodiment 530 in FIG. 5C.

In one example, the protrusion 64 may be in the closed second position, the bypass portion 502, recirculating portion 504, and EGR portion 506 may be in open positions when an engine temperature is greater than a desired temperature and a temperature of exhaust aftertreatment devices is greater than a desired temperature. In this way, cooled EGR is delivered to the engine via the open EGR portion 506 and cooled exhaust gas is delivered to the exhaust passage 26 via the open recirculating portion 504. Additionally, the heat captured from the hot exhaust gas may be used to power an electrical device via a Peltier device, as described above.

Turning now to FIG. 5E, it shows an embodiment 560 comprising the protrusion 64 in the closed second position. As described above, a space between the protrusion 64 and the flange 240 in the closed second position is less than the intermediate third position and the open first position. Thus, a smaller portion of exhaust gas may flow directly through the exhaust passage 26 in the closed second position than in the intermediate third position and the open first position. Due to this impedance of exhaust gas flow, a larger portion of exhaust gas may flow from the exhaust passage 26 into the bypass passage 28 than in the intermediate third position and the open first position. In the embodiment 560, the bypass 502 and recirculating 504 portions of the three-way valve 58 are open, while the EGR portion 506 of the three-way valve 58 is closed. Thus, exhaust gas in the bypass passage 28 is cooled in the heat exchanger 56 prior to flowing back to the interior passage 72. The vacuum generated between the flange 240 and the protrusion 64 may promote the cooled exhaust gas in the bypass passage 28 to flow back to the interior passage 72, which is then returned to the exhaust passage 26. Thus, an amount of exhaust gas flowing through the exhaust passage 26, downstream of the bypass valve 60, in embodiment 560 is substantially equal to an amount of exhaust gas flowing through the exhaust passage 26 in the embodiment 500 at similar engine conditions. However, an exhaust gas temperature in the exhaust passage 26 in the embodiment 560 is less than an exhaust gas temperature in the exhaust passage 26 in the embodiment 500. In this way, exhaust gas in the exhaust passage 26 in the embodiment 560 may decrease a temperature of aftertreament devices located along the exhaust passage 26 downstream of the bypass valve 60.

In one example, the protrusion 64 may be in the closed position, the bypass portion 502 and recirculating portion 504 may be open, and the EGR portion 506 may be closed when the engine does not desire EGR and a temperature of one or more exhaust aftertreatment devices are greater than the desired operating temperature. As such, cooled exhaust gas is diverted back to the exhaust passage 26 without flowing EGR to the engine.

An example method may include during a first condition, moving the bypass valve to a more closed position and moving the three-way valve to a closed position, and flowing exhaust gas from an exhaust passage, through a heat exchanger, and through a fixed protrusion of the bypass valve back into the exhaust passage. The method may further include transferring heat from the heat exchanger to a working fluid of the vehicle, where the working fluid is an engine coolant in one example. The example method may further include during a second condition, moving the bypass valve to a more closed position and moving the three-way valve to an open position, and flowing exhaust gas from the exhaust passage, through the heat exchanger, and into an EGR passage toward an engine intake. The example method may further include during the second condition, transferring the heat from the heat exchanger to one or more of a Peltier device or a Rankine cycle. The example method may further include, during a third condition, moving the bypass valve to a fully open position and the three-way valve to a fully open position, and flowing exhaust gas from the exhaust passage, through the fixed protrusion, through the open three-way valve, into the EGR passage, and to an engine intake. The example method may further include, during a fourth condition, moving the bypass valve to a fully open position and the three-way valve to a fully closed position, and flowing exhaust gas through the bypass valve without flowing the exhaust gas to the heat exchanger and EGR passage.

Another example of a method may comprise flowing exhaust gas through an exhaust passage while not flowing exhaust gas through a bypass passage, a recirculating passage, and an EGR passage with a three-way valve in a fully closed position and a bypass valve in a more open position, flowing exhaust gas through the exhaust passage and through the recirculating passage into the EGR passage, while not flowing exhaust gas through the bypass passage with a bypass portion of the three-way valve being closed and the three-way valve in the more open position, and flowing exhaust gas through the exhaust passage and through a heat exchanger of the bypass passage into the EGR passage, while not flowing exhaust gas through the recirculating passage with a recirculating portion of the three-way valve being closed and the bypass valve in a more closed position. The method includes moving the bypass valve to the more open position includes actuating a protrusion away from a similarly shaped flange along the exhaust passage, and where moving the bypass valve to the more closed position includes actuating the protrusion toward the flange along the exhaust passage. The bypass passage is fluidly coupled to the exhaust passage upstream of the bypass valve, the recirculating passage is fluidly coupled to an interior passage of a flange of the bypass valve, and the EGR passage is fluidly coupled to an intake passage. The heat exchanger is configured to cool exhaust gas flowing therethrough, and where the heat exchanger is further adapted to transfer heat received from exhaust gas passed therethrough to a heat receiving device.

The method further comprises during a first mode, flowing exhaust gas through the exhaust passage while not flowing exhaust gas through the bypass passage, the recirculating passage, and the EGR passage by moving a protrusion of a bypass venturi valve to the more open position away from a flange of the bypass venturi valve and fully closing the three-way valve, during a second mode, flowing exhaust gas through the exhaust passage and through the recirculating passage into the EGR passage, while not flowing exhaust gas through the bypass passage by moving the protrusion to the more open position away from the flange and closing the bypass portion of the three-way valve while opening recirculating and EGR portions of the three-way valve, during a third mode, flowing exhaust gas through the exhaust passage and through the heat exchanger of the bypass passage into the EGR passage, while not flowing exhaust gas through the recirculating passage by moving the protrusion to the more closed position toward the flange and closing the recirculating portion while opening the bypass and EGR portions of the three-way valve, during a fourth mode, flowing exhaust gas through the exhaust passage, through the heat exchanger of the bypass passage, the recirculating passage, and the EGR passage by moving the protrusion to the more closed position toward the flange and opening the bypass, recirculating, and EGR portions of the three-way valve; and during a fifth mode, flowing exhaust gas through the exhaust passage, through the heat exchanger of the bypass passage, and the recirculating passage, while not flowing exhaust gas through the EGR passage by moving the protrusion to the more closed position toward the flange and opening the bypass and recirculating portions and closing the EGR portion of the three-way valve.

In one example, the first mode may be in response to a mid-load engine load where exhaust gas temperatures and an engine temperature are substantially equal to a threshold exhaust gas temperature and threshold engine temperature (e.g., optimal engine operating temperature), respectively. Furthermore, a particulate filter regeneration may not be occurring. The second mode may be in response to a low engine load, where the engine temperature is less than the threshold engine temperature. The third mode may be in response to a high engine load where the engine temperature is greater than an upper threshold engine temperature (e.g., temperature suitable for degrading the engine). The fourth mode may be in response to the high engine load where the engine temperature is greater than the upper threshold engine temperature and an aftertreatment device temperature being greater than a threshold device temperature (e.g., temperature suitable for degrading the device). The fifth mode may be in response to an engine temperature being equal to the threshold engine temperature and the aftertreatment device temperature being greater than the threshold device temperature.

The method further includes where the three-way valve being fully closed includes the bypass portion, recirculating portion, and EGR portion of the three-way valve are in closed positions. The protrusion further includes an intermediate position between the open and closed positions, and where the intermediate position provides an amount of exhaust flow to one or more of the exhaust passage, the bypass passage, the recirculating passage, and the EGR passage between amounts provided in the open position and the closed position.

Turning now to FIGS. 6A, 6B, and 6C, they show methods for operating the bypass valve 60 and the three-way valve 58 based on engine conditions.

Turning now to FIG. 6A, it shows a high-level flow chart depicting a method 600 for determining if a vehicle is demanding EGR. Instructions for carrying out method 600 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 602, the method 600 includes determining, estimating, and/or measuring current engine operating parameters. The current engine operating parameters may include one or more of engine load, engine temperature, cold-start, engine speed, vehicle speed, exhaust gas pressure, exhaust gas temperature, exhaust gas flow rate, catalyst light-off, ambient temperature, and air-fuel ratio.

At 604, the method 600 includes determining if an EGR demand is present. The EGR demand may be present based on current engine operating parameters described above. As an example, if an engine load is high, then the engine may demand EGR to decrease an engine temperature which may assist in reducing emissions during high-load engine operation. As another example, if the engine is in cold-start, then the engine may not demand EGR to decrease a likelihood of engine knock.

If there is no EGR demand, then the method 600 proceeds to 606 shown in FIG. 6B. At 606, the method 600 includes determining if a cold-start is present. The cold-start may be determined based on an engine being initiated (e.g., engine spinning and cylinders firing) when an engine temperature is less than a threshold operating temperature, where the threshold temperature operating temperature is a desired engine temperature range (e.g., 185° to 205° C.) in one example. Additionally or alternatively, the cold-start may be determined if the engine is initiated after a threshold time has elapsed since a previous engine operation, where the threshold time is based on an amount of time where the engine may cool to a significantly cool temperature (e.g., a temperature below the threshold operating temperature). In one example, the threshold time may be adjusted based on an ambient temperature and/or other atmospheric conditions. For example, if the ambient temperature decreases, then the threshold time may decrease to account for the engine cooling down more quickly at colder ambient temperatures.

If a cold-start is occurring, then the method 600 proceeds to 608 to close the EGR portion (e.g., EGR portion 506), open the bypass and recirculating portions (e.g., bypass and recirculating portions 502 and 504, respectively) and move the protrusion to a more closed position, where a portion of exhaust gas from an exhaust passage is directed to a bypass passage comprising a heat exchanger (e.g., a portion exhaust gas from exhaust passage 26 flows into bypass passage 28 toward the heat exchanger 56). Thus, the positions of the protrusion and portions of the EGR valve depict the example shown in embodiment 560 of FIG. 5E. As described above, EGR may not be desired during cold-start due to combustion stability issues. Closing the EGR portion of the three-way valve seals the EGR passage from the bypass passage. Moving the bypass valve to the more closed position includes actuating the protrusion of the bypass valve toward the fixed projection. An amount of exhaust gas flowing to the bypass passage may be based on a position of the bypass valve, wherein a more closed position of the protrusion may lead to a greater amount of exhaust gas flowing into the bypass passage. In one example, a fully closed position of the bypass valve results in a largest amount of exhaust gas flowing into the bypass passage. However, a remaining portion of exhaust gas flows through the bypass valve (e.g., between a fixed projection and the slidable protrusion) when it is in the fully closed position such that not all of the exhaust gas in the exhaust passage is directed to the bypass passage. In some examples, when the bypass valve is in the fully closed position, all the air in the exhaust passage may be directed to the bypass passage. In this example, apexes of the protrusion and the flange are touching.

At 610, the method 600 includes flowing the exhaust gas from the exhaust passage, to the bypass passage, through the heat exchanger, and back to the exhaust passage. Vacuum may be generated between the protrusion and the flange of the bypass valve, where the vacuum may promote flowing the cooled EGR downstream of the heat exchanger to a recirculating conduit, into an interior passage of the flange, and into the exhaust passage. Additionally, as exhaust gas flows through the heat exchanger, heat may be transferred from the exhaust gas to thermally conductive materials of the heat exchanger (e.g., phase changing materials). As such, the heat exchanger is configurable to transfer the heat received from the exhaust gas to a vehicle heat receiving device of the vehicle (e.g., heat receiving device 60 shown in FIG. 1). In one example, during the cold-start, the heat exchanger may warm-up a working fluid of the vehicle (e.g., engine coolant) to decrease a heating period of a cold-start.

Returning to 606, if a cold-start is not occurring, then the method 600 proceeds to 612 to where it determines if exhaust gas cooling is desired. Exhaust gas cooling may be desired if a catalyst temperature is too high, exhaust gas temperature is too high, and/or if a particulate filter regeneration temperature is too high. If cooling is not desired, then the method 600 proceeds to 614 to move the bypass valve to the open first position and to close the EGR portion of the three-way valve. In the open first position, substantially all of the exhaust gas flows through the exhaust passage with substantially no exhaust gas flowing to the bypass passage and/or the EGR passage, in one example. The bypass valve position and positions of portions of the three-way valve at 614 are similar to the example of embodiment 500 of FIG. 5A.

If cooling is desired, then the method 600 proceeds to 616 to close the EGR portion of the three-way valve and move the bypass valve to a more closed position (e.g., closed second position), where the more closed position may include an intermediate position or the fully closed position. Furthermore, the bypass and recirculating portions of the three-way valve are moved to open positions. Thus, at least a portion of exhaust gas in the exhaust passage is directed to the heat exchanger located in the bypass passage, where the exhaust gas may be cooled.

At 618, the method 600 includes flowing exhaust gas from the exhaust passage, through the heat exchanger in the bypass passage, through the recirculating conduit, through the interior passage of the flange, and into the exhaust passage in the bypass valve. In this way, an exhaust gas temperature flowing to exhaust aftertreatment devices may be controlled based on an actuation of the bypass valve. As such, the exhaust gas flowing to the exhaust aftertreament devices may be coolest when the bypass valve is in the fully closed position. The positions of the bypass valve and portions of the three-way valve at 618 are similar to the example shown in the embodiment 560 of FIG. 5E.

As an example, the cooling may be used to decrease an operating temperature of one or more exhaust aftertreatment device. A catalyst temperature may be greater than or equal to a threshold catalyst temperature during some engine conditions, where the threshold catalyst temperature is based a temperature increasing a likelihood of catalyst degradation. Thus, the cooled exhaust gas may be used to reduce the catalyst temperature and to decrease a likelihood of the catalyst degrading. Additionally or alternatively, a particulate filter (e.g., particulate filter 22 in FIG. 1) may be periodically reset via passive or intrusive methods. Intrusive methods include actively adjusting engine operating parameters including but not limited to, leaning an air/fuel ratio, late fuel injection, retarding spark, etc. to increase exhaust temperatures. During the regeneration, a temperature of the particulate filter increases and soot is burned off. However, during the regeneration, a burn temperature of the regeneration may exceed a threshold burn temperature where the particulate filter may become degraded. In one example, the degradation of the particulate filter may include the particulate filter developing cracks and/or holes. In this way, the exhaust gas temperature may be adjust to control a burn temperature of the particulate filter such that degradation of the particulate filter is less likely.

As another example, following regeneration of the particulate filter, ash may build up on a front face of the particulate filter. As such, the cooled exhaust gas may be used to cool surfaces in the exhaust passage such that water vapors in hot exhaust gas not flowing to the heat exchanger may condensate onto surfaces of the exhaust passage. In this way, the condensate may be used to sweep the accumulated ash through the particulate filter and out a tailpipe of the exhaust passage to an ambient atmosphere.

Returning to 604, if EGR is determined to be desired, then method 600 proceeds to 620, shown in FIG. 6C, to determine if EGR cooling is desired. EGR cooling may be desired if one or more of an EGR temperature is greater than or equal to a threshold EGR temperature or an engine temperature is greater than or equal to a threshold engine temperature. The threshold EGR temperature may be based on an EGR temperature being too high to provide the desired reduction in combustion temperature. The threshold engine temperature may be based on an engine temperature which may result in increased emissions and/or engine degradation. Thus, the EGR may be cooled to provide the desired cooling of one or more of a combustion temperature and the engine temperature.

If cooling is desired, then the method 600 proceeds to 622 to determine if exhaust gas cooling is desired, which is similar to 612 described above. If exhaust gas cooling is not desired, then method 600 proceeds to 624 where the protrusion of the bypass valve is moved to a more closed position to bypass exhaust gas from the exhaust passage to the bypass passage.

Additionally, the bypass and EGR portions of the three-way valve are moved to open positions while the recirculating portion is moved to a closed position. In one example, the protrusion is adjusted based on an amount of desired EGR. For example, if a maximum amount of EGR is desired, then the protrusion is moved to a fully closed position. Alternatively, the protrusion may be moved to an intermediate third position to provide a moderate amount of EGR to the engine.

At 626, the method 600 includes flowing the cooled EGR in the EGR passage to the intake passage where the EGR may flow to the engine. In this way, exhaust gas flows from the exhaust passage, through the heat exchanger in the bypass passage, through the EGR passage, and into an intake manifold or intake passage. As such, the EGR is cooler than exhaust gas in the exhaust passage. Additionally or alternatively, an engine operating temperature may be substantially equal to or greater than the desired engine operating temperature. As such, heat absorbed by the heat exchanger is provided to a Peltier device and/or a Rankine cycle, without providing heat to a working fluid, to operate an electrical device of the vehicle. This may be due to the working fluid already operating within a desired temperature range where additional heat may overheat the working fluid. The position of the bypass valve and the positions of portions of the three-way valve at 626 are similar to embodiment 530 shown in FIG. 5C.

Returning to 622, if exhaust gas cooling is desired, then method 600 proceeds to 628 to move the protrusion of the bypass valve to a more closed position and to open the bypass, recirculating, and EGR portions of the three-way valve at 628.

At 630, the method 600 includes flowing exhaust gas from the exhaust passage, through the heat exchanger of the bypass passage, and into one or more of the recirculating passage and the EGR passage. Exhaust gas in the recirculating passage flows through the interior passage of the flange and back into the exhaust passage in the bypass valve. Thus, cooler exhaust gas from the recirculating passage is merged with hotter exhaust gas that was not bypassed. Exhaust gas in the EGR passage flows to either an intake manifold or intake passage leading to the intake manifold. In one example, during a high engine load, a particulate filter temperature may be greater than a regeneration temperature threshold while an engine temperature is greater than the desired engine temperature. Thus, the engine temperature may be reduced while also reducing a regeneration temperature of the particulate filter. As such, a likelihood of degradation for both the engine and the particulate filter is reduced. The positions of the bypass valve and portions of the three-way valve at 628 are similar to those shown in embodiment 545 shown in FIG. 5D.

Returning to 620, if no cooling is desired, then method 600 proceeds to 632, which includes moving the protrusion of the bypass valve to a more open position. Additionally, the bypass portion of the three-way valve is moved to a closed position while the recirculating and EGR portions of the three-way valve are moved to open positions.

At 634, the method 600 includes flowing exhaust gas from the exhaust passage, through the interior passage of the flange, through the recirculating passage, through the EGR passage, and into the intake manifold or intake passage. In this way, exhaust gas does not flow through the heat exchanger and hot EGR may be delivered to the intake manifold. In one example, manifold vacuum may promote the flow of hot exhaust gas from the exhaust passage to the intake manifold. As such, manifold vacuum is fluidly coupled to the exhaust passage at 634. The positions of the bypass valve and the three-way valve at 634 are similar to those shown in embodiment 515 shown in FIG. 5B.

In this way, a bypass valve and three-way valve may be used to provide myriad exhaust flows through an exhaust passage and EGR passage. By adjusting one or more of the bypass valve and the three-way valve, an amount of EGR delivered to an engine and an amount of exhaust gas discharged to an atmosphere may be adjusted. Furthermore, a temperature of the exhaust gas and the EGR may also be altered. The technical effect of using the bypass valve and the three-way valve is to provide a greater control over EGR and exhaust gas temperatures while reducing packaging restrictions. Furthermore, manufacturing costs may also be reduced by introducing only two valves.

A method may comprise flowing exhaust gas through an exhaust passage while not flowing exhaust gas through a bypass passage, a recirculating passage, and an EGR passage with a three-way valve in a fully closed position and a bypass valve in a more open position, flowing exhaust gas through the exhaust passage and through the recirculating passage into the EGR passage, while not flowing exhaust gas through the bypass passage with a bypass portion of the three-way valve being closed and the three-way valve in the more open position; and flowing exhaust gas through the exhaust passage and through a heat exchanger of the bypass passage into the EGR passage, while not flowing exhaust gas through the recirculating passage with a recirculating portion of the three-way valve being closed and the bypass valve in a more closed position. A first example of the method further includes where moving the bypass valve to the more open position includes actuating a protrusion away from a similarly shaped flange along the exhaust passage, and where moving the bypass valve to the more closed position includes actuating the protrusion toward the flange along the exhaust passage. A second example of the method, optionally including the first example, further includes where the bypass passage is fluidly coupled to the exhaust passage upstream of the bypass valve, the recirculating passage is fluidly coupled to an interior passage of a flange of the bypass valve, and the EGR passage is fluidly coupled to an intake passage. A third example of the method, optionally including the first and/or second examples, further includes where the heat exchanger is configured to cool exhaust gas flowing therethrough, and where the heat exchanger is further adapted to transfer heat received from exhaust gas passed therethrough to a heat receiving device. A fourth example of the method, optionally including one or more of the first through third examples, further includes where during a first mode, flowing exhaust gas through the exhaust passage while not flowing exhaust gas through the bypass passage, the recirculating passage, and the EGR passage by moving a protrusion of a bypass venturi valve to the more open position away from a flange of the bypass venturi valve and fully closing the three-way valve, during a second mode, flowing exhaust gas through the exhaust passage and through the recirculating passage into the EGR passage, while not flowing exhaust gas through the bypass passage by moving the protrusion to the more open position away from the flange and closing the bypass portion of the three-way valve while opening recirculating and EGR portions of the three-way valve, during a third mode, flowing exhaust gas through the exhaust passage and through the heat exchanger of the bypass passage into the EGR passage, while not flowing exhaust gas through the recirculating passage by moving the protrusion to the more closed position toward the flange and closing the recirculating portion while opening the bypass and EGR portions of the three-way valve, during a fourth mode, flowing exhaust gas through the exhaust passage, through the heat exchanger of the bypass passage, the recirculating passage, and the EGR passage by moving the protrusion to the more closed position toward the flange and opening the bypass, recirculating, and EGR portions of the three-way valve, and during a fifth mode, flowing exhaust gas through the exhaust passage, through the heat exchanger of the bypass passage, and the recirculating passage, while not flowing exhaust gas through the EGR passage by moving the protrusion to the more closed position toward the flange and opening the bypass and recirculating portions and closing the EGR portion of the three-way valve. A fifth example of the method, optionally including one or more of the first through fourth examples, further includes where the three-way valve being fully closed includes the bypass portion, recirculating portion, and EGR portion of the three-way valve are in closed positions. A sixth example of the method, optionally including one or more of the first through fifth examples, further includes where the protrusion further includes an intermediate position between the open and closed positions, and where the intermediate position provides an amount of exhaust flow to one or more of the exhaust passage, the bypass passage, the recirculating passage, and the EGR passage between amounts provided in the open position and the closed position.

An exhaust passage may comprise a slidable projection included within a valve body, an inwardly projecting fixed protrusion coupled within the valve body, the protrusion comprising a hollow passage coupling an exhaust gas recirculation passage to an interior of the valve body, and a heat exchanger located in a bypass passage fluidly coupled to the exhaust gas recirculation passage. A first example of the exhaust passage further comprising where the valve body is rectangular and includes four substantially planar walls comprising two side walls, a top wall, and a bottom wall, the slidable projection and the fixed protrusion are located on separate walls opposite one another, and where a cross-section area of the valve body is greater than that of the exhaust passage. A second example of the exhaust passage optionally including the first example further includes where the slidable projection is located on the top wall and the fixed protrusion is located on the bottom wall, and where the slidable projection and the fixed protrusion comprise respective upstream first surfaces facing incoming exhaust gas flow, the first surfaces oriented at respective first angles with respect to a direction of incoming exhaust gas flow, and where the slidable projection and the fixed protrusion each comprise respective downstream second surfaces facing away from incoming intake gas flow, the second surfaces oriented at respective second angles with respect to the direction of incoming exhaust gas flow, where the second angles are less than the respective first angles. A third example of the exhaust passage, optionally includes the first and/or second examples, further includes where an inlet cone coupling an upstream portion of the exhaust passage to an upstream end of the valve body, where a first end of the inlet cone is coupled to the exhaust passage, and where a second end of the inlet cone is coupled to the valve body, and where a cross-sectional area of the inlet cone is greater at the second end than the first end. A fourth example of the exhaust passage, optionally including one or more of the first through third examples, further includes where an outlet cone coupling a downstream portion of the exhaust passage to a downstream end of the valve body, where a first end of the outlet cone is coupled to the downstream end of the valve body, and where a second end of the outlet cone is coupled to the exhaust passage, and where a cross-sectional area of the outlet cone is greater at the first end than the second end. A fifth example of the exhaust passage, optionally including one or more of the first through fourth examples, further includes where the slidable projection is movable relative to the fixed protrusion along a horizontal axis of the valve body between open and closed positions, and where an opening in the valve body formed between the slidable valve and the flange increases with increasing adjustment of the slidable projection towards an open position, away from a closed position. A sixth example of the exhaust passage, optionally including one or more of the first through fifth examples, further includes where the fixed protrusion includes an aperture formed at an apex of the protrusion adjacent the hollow passage, and where a venturi effect is created at the apex, and where a magnitude of the venturi effect increases as a distance decreases between the slidable projection and the protrusion. A seventh example of the exhaust passage, optionally including one or more of the first through sixth examples, further includes where an inlet of the bypass passage is upstream of an inlet of the valve body, and where the heat exchanger is located upstream of a three-way valve in the exhaust gas recirculation passage. An eighth example of the exhaust passage, optionally including one or more of the first through seventh examples, further includes where the heat exchanger is coupled to one or more heat receiving devices, and where the heat receiving devices include a coolant system, Peltier device, and Rankine cycle device.

Another method may comprise altering a flow of one or more of an exhaust gas flowing through an exhaust passage and exhaust gas flowing to an engine by actuating a moveable protrusion to or away from a fixed flange of a bypass valve in the exhaust passage upstream of a bypass passage. A first example of the method further includes where a three-way valve is coupled to the bypass passage, a recirculating passage, and an EGR passage, and where the three-way valve comprises a bypass portion, recirculating portion, and EGR portion for adjusting exhaust flow to the bypass passage, the recirculating passage, and the EGR passage, respectively. A second example of the method optionally including the first example further includes where not bypassing exhaust gas from the exhaust passage includes actuating the protrusion to a more open position and closing the bypass, recirculating, and EGR portions of the three-way valve. A third example of the method, optionally including the first and/or second examples, further includes where flowing cooled exhaust gas to the engine includes actuating the protrusion to a more closed position, opening the bypass and EGR portions of the three-way valve, and closing the recirculating portion of the three-way valve, and where the exhaust gas is bypassed from the exhaust passage to the bypass passage comprising a heat exchanger upstream of the three-way valve.

In another representation, a system may comprise an engine having an exhaust passage, a bypass valve located in the exhaust passage downstream of a bypass passage fluidly coupled to the exhaust passage, the bypass valve having a moveable protrusion and a fixed flange, a three-way valve downstream of a heat exchanger in the bypass passage and upstream of an EGR passage, and a controller with computer-readable instructions for adjusting a position of the protrusion in the bypass valve and the three-way valve to bypass exhaust flow from the exhaust passage to one or more of the bypass passage and EGR passage. The system further includes where the three-way valve is coupled to an interior passage of the flange via a recirculating passage, and where the interior passage is fluidly coupled to the exhaust passage via an opening at an apex of the flange. The system further includes where exhaust gas is bypassed from the exhaust passage to the bypass passage when the protrusion is in a more closed position, and where the more closed position further includes cooling exhaust gas via the heat exchanger. The system further includes where the protrusion is moved to a more closed position, a bypass portion and an EGR portion of the three-way valve are moved to open positions, and a recirculating portion of the three-way valve is moved to a closed position in response to a cooled EGR demand. The system further includes where the protrusion is moved to a more closed position, a bypass portion and a recirculating portion of the three-way valve are moved to open positions, and an EGR portion of the three-way valve is moved to a closed position to flow cooled exhaust gas to the exhaust passage via an interior passage of the flange in response to a temperature of an exhaust aftertreament device downstream of the bypass valve exceeding a threshold aftertreatment device temperature. The system further includes where the protrusion is moved to a more open position, a recirculating portion and EGR portion of the three-way valve are moved to open positions, and a bypass portion of the three-way valve is moved to a closed position in response to a hot EGR demand. The system further includes where the protrusion is rotatable.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An exhaust passage comprising:
a slidable projection included within a valve body;
an inwardly projecting fixed protrusion coupled within the valve body, the fixed protrusion comprising a hollow passage coupling an exhaust gas recirculation passage to an interior of the valve body; and
a heat exchanger located in a bypass passage fluidly coupled to the exhaust gas recirculation passage.

2. The exhaust passage of claim 1, wherein the valve body is rectangular and includes four substantially planar walls comprising two side walls, a top wall, and a bottom wall, wherein the slidable projection and the fixed protrusion are located on separate walls, opposite one another, and wherein a cross-section area of the valve body is greater than that of the exhaust passage.

3. The exhaust passage of claim 2, wherein the slidable projection is located on the top wall and the fixed protrusion is located on the bottom wall, wherein the slidable projection and the fixed protrusion comprise respective upstream first surfaces facing incoming exhaust gas flow, the first surfaces oriented at respective first angles with respect to a direction of incoming exhaust gas flow, wherein the slidable projection and the fixed protrusion each comprise respective downstream second surfaces facing away from the incoming intake gas flow, the second surfaces oriented at respective second angles with respect to the direction of incoming exhaust gas flow, and wherein the respective second angles are less than the respective first angles.

4. The exhaust passage of claim 1, further comprising an inlet cone coupling an upstream portion of the exhaust passage to an upstream end of the valve body, wherein a first end of the inlet cone is coupled to the exhaust passage and a second end of the inlet cone is coupled to the valve body, and wherein a cross-sectional area of the inlet cone is greater at the second end than the first end.

5. The exhaust passage of claim 1, further comprising an outlet cone coupling a downstream portion of the exhaust passage to a downstream end of the valve body, wherein a first end of the outlet cone is coupled to the downstream end of the valve body and a second end of the outlet cone is coupled to the exhaust passage, and wherein a cross-sectional area of the outlet cone is greater at the first end than the second end.

6. The exhaust passage of claim 1, wherein the slidable projection is movable relative to the fixed protrusion along a horizontal axis of the valve body between open and closed positions, and wherein an opening in the valve body formed between the slidable projection and the fixed protrusion increases with increasing adjustment of the slidable projection towards the open position, away from the closed position.

7. The exhaust passage of claim 1, wherein the fixed protrusion includes an aperture formed at an apex of the fixed protrusion adjacent the hollow passage, wherein a venturi effect is created at the apex, and wherein a magnitude of the venturi effect increases as a distance decreases between the slidable projection and the fixed protrusion.

8. The exhaust passage of claim 1, wherein an inlet of the bypass passage is upstream of an inlet of the valve body, and wherein the heat exchanger is located upstream of a three-way valve in the exhaust gas recirculation passage.

9. The exhaust passage of claim 8, wherein the heat exchanger is coupled to one or more heat receiving devices, and wherein the one or more heat receiving devices include a coolant system, a Peltier device, and a Rankine cycle device.

* * * * *